(12) United States Patent
Canright et al.

(10) Patent No.: US 7,680,812 B2
(45) Date of Patent: Mar. 16, 2010

(54) METHOD, SYSTEM, AND COMPUTER PROGRAM PRODUCT FOR SEARCHING FOR, NAVIGATING AMONG, AND RANKING OF DOCUMENTS IN A PERSONAL WEB

(75) Inventors: Geoffrey Canright, Oslo (NO); Kenth Engo-Monsen, Fredrikstad (NO)

(73) Assignee: Telenor ASA, Fornebu (NO)

( * ) Notice: Subject to any disclaimer, the term of this patent is extended or adjusted under 35 U.S.C. 154(b) by 1183 days.

(21) Appl. No.: 11/227,495

(22) Filed: Sep. 16, 2005

(65) Prior Publication Data
US 2006/0059144 A1 Mar. 16, 2006

Related U.S. Application Data

(60) Provisional application No. 60/610,221, filed on Sep. 16, 2004.

(51) Int. Cl.
G06F 7/00 (2006.01)
(52) U.S. Cl. .................. 707/102; 707/2; 707/104.1
(58) Field of Classification Search .............. 707/5, 707/2, 3, 10, 100, 102, 104.1
See application file for complete search history.

(56) References Cited

U.S. PATENT DOCUMENTS

| | | | |
|---|---|---|---|
| 5,832,494 A * | 11/1998 | Egger et al. ............ 707/102 |
| 6,112,202 A | 8/2000 | Kleinberg | |
| 6,112,203 A | 8/2000 | Bharat et al. | |
| 6,182,065 B1 | 1/2001 | Yeomans | |
| 6,233,571 B1 * | 5/2001 | Egger et al. ............ 707/2 |
| 6,285,999 B1 | 9/2001 | Page | |
| 6,321,220 B1 | 11/2001 | Dean et al. | |
| 6,356,899 B1 | 3/2002 | Chakrabarti et al. | |
| 6,457,028 B1 | 9/2002 | Pitkow et al. | |
| 6,526,440 B1 | 2/2003 | Bharat | |
| 6,560,600 B1 | 5/2003 | Broder | |
| 6,622,139 B1 | 9/2003 | Nakayama et al. | |
| 6,694,329 B2 * | 2/2004 | Murray ............ 707/103 Y |
| 6,738,678 B1 | 5/2004 | Bharar et al. | |
| 2002/0129014 A1 | 9/2002 | Kim et al. | |

(Continued)

FOREIGN PATENT DOCUMENTS

GB 2 338 324 12/1999

OTHER PUBLICATIONS

Stuart K. Card, et al., "The WebBook and the Web Forager: An Information Workspace for the World-Wide Web"; Xerox Palo Alto Research Center; Apr. 13, 1996; pp. 111-113; CHI '96 Vancoouver; XP 000657809.

(Continued)

*Primary Examiner*—Tony Mahmoudi
*Assistant Examiner*—MD. I Uddin
(74) *Attorney, Agent, or Firm*—Oblon, Spivak, McClelland, Maier & Neustadt, L.L.P.

(57) ABSTRACT

A method, apparatus, and computer program product for a personal search engine that includes a hybrid web composed of: the similarity web, and directed hyperlinks. Components include a parser (extracting words from documents); a text relevance analyzer; a link analysis method; the similarity web; a similarity analyzer; and hyperlinks. Other components include a navigation window; and FQSs. The combination of all the above may be incorporated into a working personal search engine.

97 Claims, 8 Drawing Sheets

U.S. PATENT DOCUMENTS

2003/0003707 A1 1/2003 Yamaha
2004/0250236 A1* 12/2004 O'Malley et al. ........... 717/104

OTHER PUBLICATIONS

Wolber, et al.; "Exposing Document Context in the Personal Web"; IUI 02. 2002 International Conference on Intelligent User Interfaces ACM New York, NY, USA, 2002; pp. 151-158; XP002371675; ISBN: 1-58113-459-2.

Daniel T. Chang; "HieNet: A User-Centered Approach for Automatic Link Generation"; Proceeding of the ACM Conference on Hypertext; Nov. 14, 1993; pp. 145-158, XP002116595; Abstract p. 148, line 1, p. 149, last line.

Xiaodi Huang et al.; "Identification of Clusters in the Web Graph Based on Link Topology" Database Engineering and Applications Symposium, 2003, proceedings, seventh International, Jul. 16-18, 2003, Piscataway, NJ, USA, IEEE, (Jul. 16, 2003), pp. 117-122, XP010647158, ISBN: 0-7695-1981-4.

Ricardo Baeza-Yates et al., "Relating Web Characteristics With Link Based Web Page Ranking", String Processing and Information Retrieval, 2001. Spire 2001. Proceedings, eighth International Symposium on Nov. 13-15, 2001, Piscataway, N.J., USA, IEEE, (Nov. 13, 2001), pp. 21-32, XP010583172, ISBN: 0-7695-1192-9.

Zheng Chen et al.: "A Unified Framework for Web Link Analysis" Web Information Systems Engineering, 2002. Wise 2002. Proceedings of the third International Conference on December 12-14, 2002, Piscataway, N.J., USA, IEEE, (Dec. 12, 2002), pp. 63-70, XPO10632781, ISBN: 0-7695-1766-8.

Michaelangelo Diligenti et al., "Web Page Scoring Systems for Horizontal and Vertical Search", Proceedings of the 11th International Conference on World Wide Web—WWW2002, (May 7, 2002), pp. 508-516, XP002353433, Hawaii, USA ISBN: 1-58113-449-5.

Brian D. Davison: "Unifying Text and Link Analysis", Eighteenth International Joint Conference on Artificial Intelligence, Online! 2003, XP002353434 Bethlehem, PA, USA Retrieved from the Internet: URL: http://www.cs.cmu.edu.{dunja/TextLink2003/papers/DavisonTextLink03.pdf> 'retrieved on Nov. 10, 2005.

Henry Lieberman; "Letizia: An Agent That Assists Web Browsing"; Media Laboratory, Proceedings of the Fourteenth International Joint Conference on Artificial Intelligence (IJCAI-95); 1995; Massachusetts Institute Of Technology.

R. Lempel et al., "The Stochastic Approach for Link-Structure Analysis (SALSA) and The TKC Effect"; Jul. 21, 2003; p. 1-23.

Krishna Bharat and George A. Mihaila, "Hilltop: A Search Engine based on Expert Documents"; Aug. 27, 2003; pp. 1-4.

"The PageRank Citation Ranking: Bringing Order to the Web"; Jan. 29, 1998; p. 1-17.

Taher H. Haveliwala; "Efficient Computation of PageRank"; Stanford University; Oct. 18, 1999; pp. 1-15.

Esko Nuutila, et al.; "On Finding the Strongly Connected Components in Directed Graph"; Laboratory of Information Processing Science Helsinki University of Technology. Otakaari 1, SF-02150 Espoo, Finland, pp. 1-14.

Robert Endre Tarjan; "Depth-First Search and Linear Graph Algorithms"; SIAM J. Comput. 1(2): 146-160 (1972).

Soumen Chakrabarti et al., "Mining the Link Structure of the World Wide Web"; Feb. 1999; p. 1-12.

Jon M. Kleinberg, "Authoritative Sources in a Hyperlinked Environment"; Journal of the ACM, vol. 46, No. 5; Sep. 1999; p. 604-632.

Chris Ding et al. "PageRank, HITS and a Unified Framework for Link Analysis", The Twenty-Fifth Annual International ACM SIGIR Conference on Research and Development in Information Retrieval; Aug. 11-15, 2002, p. 353-354.

Sergey Brin, Lawrence Page, "The anatomy of a large-scale hypertextual Web search engine", Computer Networks and ISDN Systems 30; 1998; pp. 107-117.

Allan Borodin et al., "Finding Authorities and Hubs From Link Structures on the World Wide Web"; May 1-5, 2001.

* cited by examiner

METHOD, SYSTEM, AND COMPUTER PROGRAM PRODUCT FOR SEARCHING FOR, NAVIGATING AMONG, AND RANKING OF DOCUMENTS IN A PERSONAL WEB

CROSS-REFERENCE TO RELATED APPLICATIONS

The present application contains subject matter related to U.S. patent application Ser. No. 10/687,602 filed on Oct. 29, 2003 and U.S. patent application Ser. No. 10/918,713 filed on Aug. 25, 2004, the entire contents of both are incorporated herein by reference. This application also claims priority to provisional application 60/610,221, filed on Sep. 16, 2004, the entire contents of which has been incorporated by reference.

BACKGROUND OF INVENTION

1. Field of Invention

A method, device, and computer program product to aid in searching and navigating among files. The method allows for the building up of a web of links connecting the documents, and is suitable at least for cases where such a web is not pre-existing, for example, a single user, or small groups sharing documents.

2. Discussion of the Background Art

The current situation for any user of a personal computer is frustrating. A user is accustomed to finding, essentially instantly, almost anything of interest that exists on the Web, on any topic, plucked out from a set of Web documents that currently exceeds 8 billion in number, with the results ranked so well that usually the few highest-ranked hits give the user what is asked for. Also, it is easy for this user, having found a good hit, to follow hyperlinks from that hit and so discover related documents.

Now the same user has perhaps thousands or millions of files on his/her PC. This user needs also to search and navigate through these files. The reason is, of course, that the number of files makes it impossible to remember what they all are, where they are in the hierarchical file system, and what they contain. Hence the user needs help: a) in finding specific files, and b) in finding files related to a topic or theme. This is of course precisely the kind of help one gets—in the case of the Web—from current Web search engines. The frustrated user then asks, "Why is it so much harder to find things on my own PC?"

The present invention is aimed at meeting just this need. That is, this invention offers methods for searching and navigating among personal files. It is also suited to supporting the same functions for files that are shared by groups.

The current state of the art in technologies to aid search and navigation over personal files is rather limited. As noted above, at present there is a clear gap between the need of users to search through ever-growing amounts of personal content, and the capabilities of present technology to meet this need. Recently, many different firms have recognized this gap, and are working hard to fill it—since a large, unmet need represents a large business opportunity. Hence in discussing the current state of the art, we will include both the limited technological solutions that may be bought and used today, and also those that are announced or hinted at in the public media. The point is that the field is in a state of rapid growth and change.

The idea for desktop search—meaning a search appliance to run locally on a user's own PC—has existed for some time now. One of the first Internet search engines, AltaVista, gave away free software for personal PC search in 1998, called AltaVista Discovery. Here we see an early recognition of a fact which is now understood by many: the sheer number of digital documents that even a single user must relate to has grown so large that the old, hierarchical method of organizing and navigating among files is hopelessly inadequate.

Microsoft has been aware of the problem facing PC users searching for information in computer files for more than a decade. Microsoft's vision of a unified data store in its Windows operating system (Cairo, with OFS—Object File System; ideas date back to at least 1990) has been the source of many public announcements. These announcements have continued up to now, and are revised often. (After several postponements, the current announced launch date for the next version of Windows, code-named Longhorn, is 2006.) The solution offered by Microsoft is to replace the basic plumbing of its Windows operating system with technology borrowed from its SQL Server database software. Currently, documents, Web pages, e-mail files, spreadsheets and other information are stored in separate, mostly incompatible software. The new technology, code-named WinFS, promises to unify storage in a single database built into Windows that's more easily searchable, more reliable, and accessible across corporate networks and the Internet.

In October, 2004, Google released a beta version of its Google Desktop Search engine. In contrast to the Microsoft 'total-overhaul' approach, Google Desktop Search consists of a relatively small and easily downloaded set of software modules, which scan and index the contents of a user's PC. The index is then used to support fast searches. Documents which are indexed include text files, Word files, Powerpoint, excel, Outlook mail files, and browsed Web documents.

Subsequently (in December 2004), Microsoft released a beta version of its Microsoft Toolbar Suite, which includes both desktop search and Web search. Microsoft had previously purchased the Lookout desktop search technology; Lookout (as evidenced by its name) focused on searching through Outlook files.

Also in December 2004, Ask Jeeves introduced a beta version of a downloadable desktop search engine. This engine likely integrates technology acquired from the firm Tukaroo, which was bought by Ask Jeeves. In the same month, Yahoo announced that it would release a test version in early 2005. Yahoo has purchased a large number of earlier technologies, most notably Overture—which had itself purchased several engines, including AllTheWeb. Yahoo is developing its desktop search engine in cooperation with X1.

There are many other firms offering desktop search products. The brief summary above is certain to be rapidly outdated; hence we do not try here for completeness. An overview of desktop search firms and products may be found at goebelgroup's website.

An important question is, "What technology do these new players use?" Little information is disclosed in the publicly available announcements by these firms; and it is very hard to find any details about the actual search technology that are used. The vast majority of these firms seem clearly to offer keyword-based search, using indexing over various file types; and many offer both desktop and enterprise search. However, we have not found any firm which clearly bases its ranking of search results on link analysis. In fact, it is not clear whether any of the above firms use links at all—either for ranking or for navigation.

A technology that does apparently make some use of links is that of the Autonomy Corporation. Autonomy has recently launched IDOL Enterprise Desktop Search. Autonomy technology includes symmetric "similarity links" between documents. The similarity measure is sophisticated, using probabilistic measures of concept similarity. Also, the concept analysis is used in the searching process, replacing the reliance purely on keywords. However, there is no sign of the use of one-way hyperlinks such as proposed in the present invention, and no evidence of the use of link analysis. In fact, Autonomy explicitly rejects the use of any kind of page ranking technique. That is, as noted in a press release: "Instead of page ranking, an approach which has been proven to be ineffective in the link free enterprise, Automatic Query Guidance uses conceptual clustering . . . ."

Thus, as discovered by the present inventors, in order to be able to build good searching, ranking, and navigation tools for a wide variety of documents, it is preferable to have a proper link structure on the local file system that can be exploited in a link analysis. The kind of link structure that is present on the World Wide Web represents the way people relate to information far better than does the traditional hierarchical file system, with each document forced into a single place in a hierarchical tree. If such a link structure already had been present on today's PCs, a link-analysis based search-and-ranking device for local hard disks would probably already exist.

None of the solutions proposed to date build the necessary link infrastructure to enable link analysis-based ranking for search and navigation among files of a single user or a small group. The present invention remedies this by proposing a way for generating a local link structure.

As explained in more detail below, hyperlinks can provide two types of information: they can indicate a similarity between two files (symmetric), and/or they can imply a recommendation that a viewer starting at file A may find file B interesting (one-way or asymmetric). Also, links can be used for two purposes: they can help in searching (via ranking), and in navigation.

Current technologies for non-WWW document systems either lack hyperlinks entirely—thus missing both the ranking and the navigation benefits—or they use only similarity (e.g., Autonomy). In the latter case, the option of exploiting human judgment to provide recommendations about files, and about relationships between files, is lacking. Without such recommendations, both search (ranking) and navigation will suffer in quality.

Link analysis has played a crucial role in the enormous success of the Google Web search engine. Before Google, main approaches to ranking of hits from a search used one or more of: text relevance, "link popularity", and human judgment (Yahoo). Text relevance is always important, but not sufficient in itself to give good ranking results. Link popularity is characterized by counting the links pointing to a page. Link popularity is the crudest form of link analysis, and is too easily fooled by fake links. Finally, human judgment, though always useful, is too slow and costly for distributed document systems with many documents and a high turnover rate.

Google was the first Web search engine known to the inventors to make use of nontrivial link analysis by way of the well-known PageRank algorithm. An advantage of PageRank—along with other forms of nontrivial link analysis, such as those cited in U.S. patent application Ser. No. 10/687,602 and U.S. patent application Ser. No. 10/918,713—is that PageRank makes use of a collective form of human judgment. That is, most of the huge number of links, connecting billions of Web pages, are laid down by millions of humans (Web page designers). Hence nontrivial link analysis is a clever way to harness the free labor of these millions of humans, extracting their collective judgment, in order to find the best Web pages.

For the most part, when a Web designer lays down a link from his own page A to another page B, it means that (in the Web designer's opinion) a reader interested in page A is likely also to be interested in page B. That is, such a link may be interpreted as implying some mixture of two things: (i) that page B is similar to page A; and/or (ii) that page B is likely to be interesting to someone interested in page A.

In short: link analysis is valuable because links convey two things: similarity and recommendation.

While these approaches have been applied to networked environments, consumers are faced with the dilemma of how to deal with thousands or millions of files located on their personal computer.

What is desired, as recognized by the present inventors, are tools to develop a Personal Web of links, enabling a user to rank hits from a keyword search, and to navigate through these files. The term "Personal Web" refers to the network of linkages between documents that are built up by the current invention. The Personal Web includes the combination of: (i) undirected, weighted links, based on similarity; (ii) directed, weighted links, which may or may not be anchored to text on the pointed or pointed-to document, and which represent recommendation; and (iii) weights (importance scores) assigned to the documents themselves—again representing recommendation.

Ranking and navigating will always be important functions in the world of large masses of information. The Personal Web supports both of these functions in a unique and effective way—by incorporating the two crucial aspects of similarity and recommendation—as discussed in some detail next.

First we address similarity. The present invention uses machine algorithms to evaluate similarity between documents or files. As noted above, at least one other approach (that of Autonomy) uses similarity analysis between documents to aid the user in finding and navigating between these documents. This measure of similarity is different from that of Autonomy. Another difference is the use weighted similarity links, which are generated by the previously described similarity analysis, as a component in the total link analysis approach—which in turn supports the ranking of hits from a search. Also, the similarity links play an important role in aiding navigation.

Next we come to recommendation. Recommendation is often best done by humans. However the case of a single user evaluating his/her own files is rather different from the case of evaluating files on the Web. On the Web, millions of users contribute to recommendations among billions of Web pages. In this situation, each user only makes recommendations for a relatively small number of other documents. In the one-user case, it is often not realistic or practical for a user to go through many thousands of pre-existing files, and attempt to lay down links pointing to other related and/or interesting files. That is, one cannot simply create "a Web on the desktop" by attempting to make a personal Web just like the World Wide Web—because the burden of labor on the single user is too great.

Another difference from the WWW is also relevant. That is, the single user is often in fact the only person who is qualified to evaluate the quality or interest of his/her own files—no one else can do this, and no machine can do this. The user has read—or at least has some knowledge of—all of these files. In contrast, on the WWW, there is no way that any one person can evaluate all pages on the Web.

Summing up these two differences: on the Web, many individuals do the job of reading; and many individuals do the job of recommending/evaluating, via hyperlinks. In the single-user case, one individual can be expected to do (albeit of course imperfectly) the job of reading the files; and yet this one individual is not expected to be willing to do the labor of laying down links from each file to others. This mismatch between the resources of the recommender(s) and the number of documents to be reviewed/recommended has so far prevented any systematic application of hyperlinks to document systems other than the World Wide Web.

To address this mismatch, the present invention includes a hybrid form of recommendation. This hybrid provides to the user the option of laying a hyperlink from any file to any other. This hybrid also however provides another mechanism for recommendation: each file will be given a "file quality score" or FQS. Each file will have a default value, which is rather low on the scale of possible FQSs. This value may be modified automatically, based on measures such as recentness and/or frequency of use of a document. Also, the user can increase (or decrease) this FQS at will, whenever it is convenient—for example, after opening/reading the file. The FQS is the least labor-intensive possible method for including recommendations into a system of documents. The present invention adds even greater flexibility by including also the possibility of user-chosen hyperlinks. It is in this sense that one embodiment of the recommendation system is hybrid: it includes both weights on the nodes of the graph (the documents, with their FQSs), and directed links between the nodes (thus recommending the pointed-to document from the pointing document).

SUMMARY OF THE INVENTION

A method, apparatus, and computer program product for a personal search engine that includes a Personal Web composed of: the similarity web, hyperlinks (generated manually and automatically), and file quality scores which are updated both manually and automatically. Components include a parser (extracting words from documents); a text relevance analyzer; a link analysis method; the similarity web; a similarity analyzer; and hyperlinks applied to personal files on a PC. Other components include a navigation window; and FQSs. The combination of all the above may be incorporated into a working personal search engine.

DETAILED DESCRIPTION OF THE INVENTION

Figure 1:
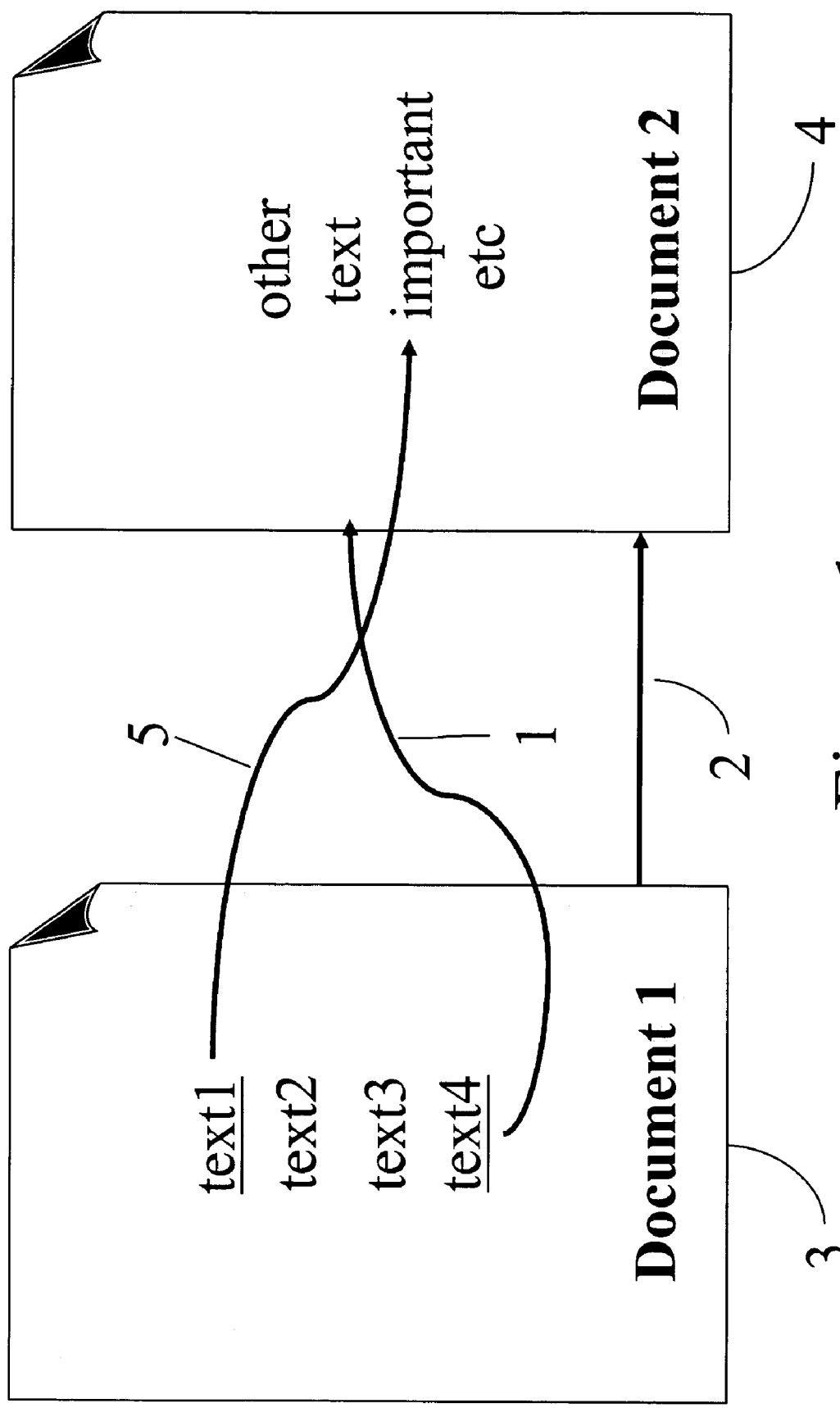
FIG. 1 illustrates two types of hyperlinks between documents used in the present invention.

The present invention involves the building of a "Personal Web" among documents which otherwise would have little or no link structure. The Personal Web includes the combination of: (i) undirected, weighted links, based on similarity; (ii) directed, weighted links, which may or may not be anchored to text on the pointed or pointed-to document, and which represent recommendation; and (iii) weights (importance scores) assigned to the documents themselves—again representing recommendation.

We also use the term "hybrid Web" to describe this structure. The Personal Web is a hybrid in two senses. First, it uses a hybrid mixture of weighted, symmetric similarity links and weighted, directed recommendation links. Secondly, the important function of recommendation is accomplished using a hybrid mixture of directed links and file quality scores (FQSs).

Next we elaborate on the hybrid form of recommendation used in the present invention. This hybrid approach provides to the user the option of laying a hyperlink from any file to any other. (As seen below, this hyperlink may or may not be anchored to specific text, at either end.) In this context we offer a precise definition of the term "hyperlink", so as to avoid ambiguity. Logically, a hyperlink is a pointer which points from a file (say, file A) to another file (say, file B). In addition, one may associate a hyperlink weight (HLW) with this pointer. This logical definition (pointer plus weight) is implied whenever we use the term hyperlink in describing the present invention. Physically, such hyperlinks are typically implemented in the form of metadata, which is typically included in (stored with) the metadata of file A—the pointing file. Also, any weight associated with the hyperlinks is also stored as metadata—typically (again) for file A.

In addition to hyperlinks, the hybrid recommendation approach provides another mechanism for recommendation: each file will be given a file quality score or FQS. Initially, each file is given a default value for its FQS, which is rather low on the scale of possible FQSs. The user can then increase (or even decrease) this FQS at will.

Also, in one embodiment of the invention, automatic methods for altering FQSs may be used. For example, the computer itself can log the number of times a file is opened and/or edited over a period of time, and give higher FQS scores to files which are opened frequently. Also, recentness of access may be a used as a measure of importance.

The rationale for this hybrid system is as follows. First, no exhaustive labor is required. Only files for which the user is motivated to do so, get recommendations. Second, choosing an FQS is easier than laying down links—it is perhaps the most minimally demanding form of recommendation possible. Yet even here, only a minimal user effort is needed. Files start with a default FQS; this in turn may be modified by certain machine-measurable indicators of importance. Only those files which the user judges are "worth the bother" will get a user-modified (typically enhanced) FQS value.

Hence the following picture is developed. The user comes no doubt to his/her first use of the "personal Web search engine" with a large backlog of files. The engine itself then takes on the job of crawling the user's file system, scanning the text of the files, building an inverted index, and building a "similarity web" which places a weighted, symmetric link between each pair of files. The weight on the link is the similarity measure. Also, the engine assigns a low, default FQS to every file, possibly modifying this default value based on information from file logs.

Hence, without any effort at all, the user acquires a similarity web connecting all files, an importance score for each file, and an inverted index. These features already allow for search and navigation. The user can then supplement this starting picture by laying in recommendations. The motivation for doing so is that they are "reminders to oneself". If the user lays down a hyperlink from file A to file B, it is a reminder that says, "Once I have opened A, I am likely to want to jump to B". Furthermore, the hyperlinks used here, like those on the Web, can be embedded in the text, so that they point from specific places in the text in file A, and/or to specific places in file B.

The reader/owner of the file can also lay in recommendations (to him- or herself) using FQSs. For example, if the reader instead chooses to raise the FQS of file C from its given value, this is a reminder of the form, "I want file C to have a higher than average chance of turning up when I do a search for files". Similarly, the reader may wish to downgrade the FQS of a file which is judged to be of little interest, even though it should not be deleted.

The resulting hybrid web will have both symmetric (undirected) links, and one-way or directed links. Mathematically, such a graph is still a directed graph, and so can be handled by methods (such as those described in previously incorporated U.S. patent application Ser. No. 10/687,602 filed on Oct. 29, 2003, and U.S. patent application Ser. No. 10/918,713 filed on Aug. 25, 2004) appropriate to directed graphs.

A tuning parameter is involved here, in determining how much weight a directed, user-written hyperlink shall have, in comparison to the similarity weights on the symmetric similarity links. That is: one embodiment of the present invention uses link analysis to rank documents; and the input to the link analysis is the hybrid Web, composed of both undirected similarity links, and directed hyperlinks. The relative weights of these two types of links will thus affect the results of the link analysis. In a preferred embodiment of the invention, the similarity weights will fall in a range from 0 to 1. Then, in one embodiment of the invention, the hyperlinks are given a default weight of 1. Alternatively (holding the similarity weights to the same range of 0 to 1), the hyperlinks can be given a default, but tunable (i.e., adjustable by the user) weight HLW.

FQSs give yet a third score for each document, which may be used in addition to scores from link analysis and text relevance analysis. That is, ranking of hits after a search is based on a combination of (i) text relevance score, (ii) link analysis weight, and (iii) FQS. Again one has two tuning parameters here, to be used in determining the relative strengths to be given to these three weights.

Finally we come to navigating. The present embodiment incorporates three mechanisms to aid in navigating.

First, there are those hyperlinks which are anchored in text. Anchored hyperlinks work for the user in a way analogous to the use of hyperlinks for navigating on the WWW: text in a document is highlighted, thus conveying to the user that the text is coupled to a hyperlink to another document (or to another point in the same document). Second, the embodiment allows the user to lay down non-anchored hyperlinks, which point from file A to file B. Thirdly, the similarity web provides links to every other file, from file A.

We note here that the term "hyperlink" is commonly used to refer to that highlighted text which is used to present to the user (in an interface) an anchored hyperlink. In this document, the term "hyperlink" refers to the logical pointer (with weight) as discussed above. Hence we will use the term "active icon" for any highlighted text (or other symbol) which is presented to the user in an interface, such that the user can activate the icon and so open the pointed-to file. That is, the icon in the interface is not a hyperlink by our definition; rather, the logical (weighted) pointer "behind" the icon is the hyperlink.

As shown in FIG. 1, an anchored hyperlink is anchored to text in the pointing document 3 and pointing to the pointed-to document 4. A non-anchored hyperlink 2 points from the pointing document 3 to the pointed-to document 4. It is also possible to have the hyperlink anchored to specific text in the pointed-to document. For instance, in FIG. 1, an anchored hyperlink 5 points from text "text1" in the pointing document 3 to the text "important" in the pointed-to document 4.

To support navigation, the present invention allows the user, who has opened file O, to pull up a navigation window showing files which O links to. This window will have up to three ranked lists. One list will be the top-ranked similarity links. These links will be ranked by the similarity weight, by the link analysis score, and by the FQS of the file linked to. A second list will have the top-ranked files which are pointed to by hyperlinks from O—ranked according to their FQS values, their link analysis scores LA, and their hyperlink weights. A third list will then have the top-ranked files which point to O—again ranked by their FQSs, their LA scores, and by the hyperlink weights.

Now we address, in more detail, the components of the invention described above by referring to FIG. 2, which describes both the search process, and the present invention, in the form of a search engine and its components.

The user initiates a search 225 by inputting keywords 223 to a search interface. The keywords are fed to the hit list generator 235. The hit list generator uses the keywords to extract a hit list 237 from the inverted index 233.

The inverted index is a file that takes one keyword as input, and then gives a list of files, containing that keyword, as output. This is standard technology and uses techniques which are well known to practitioners of the art. For multiple-keyword searches, one also needs the ability to pull out, from the inverted index, all files satisfying some Boolean combination of keywords. Here again one can use known techniques. This kind of Boolean sorting function is included in the component termed "inverted index".

Figure 2:
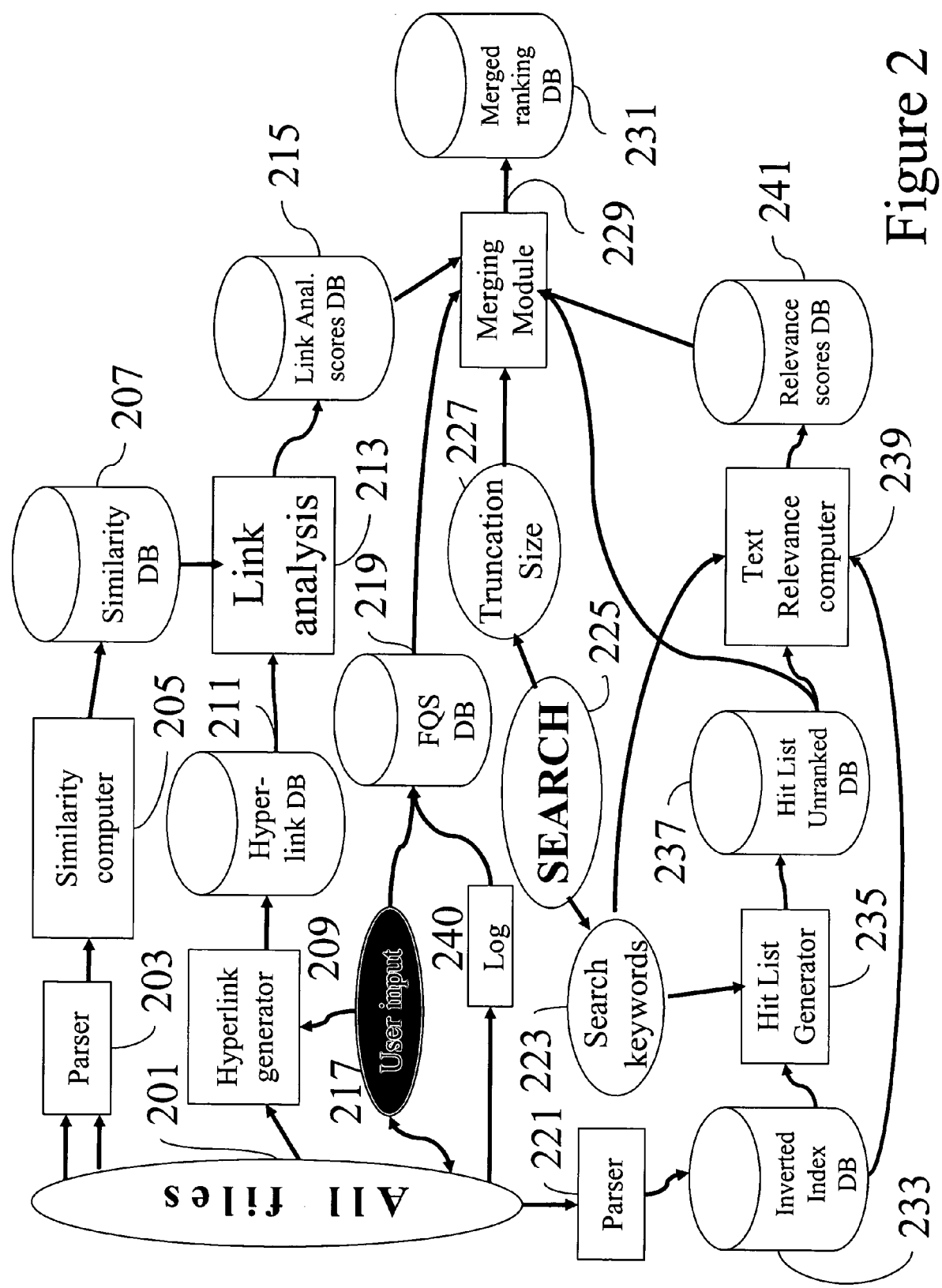
FIG. 2 is a flow diagram for a search engine according to one embodiment of the present invention.

To build the inverted index, one needs a parser (221 in FIG. 2). This component scans files 201 and recognizes words in those files. Many file types currently allow the use of parsers—for example, Word files, pdf files, text files, html files, Outlook mail files. The action of the parser, and the building and updating of the inverted index, takes place in a background process which is not initiated by the search.

Note here that personal files typically have a large number of non-text files—in particular, music files and digital picture files. One embodiment of the invention will be able to handle non-text file, assuming they have metadata which can be parsed to yield words. This assumption holds for a many types of non-text files, but not for all.

Text relevance analysis will also be used in the present invention, in the text relevance computer 239. This module takes keywords 223 as its input, along with the unranked hit list 237, and outputs a list of the same hits, accompanied by their text relevance score TR, to the relevance score DB 241. The text relevance score TR is computed, for each document on the hit list, and relative to the given keywords, using known technology.

It is worth noting here that simple forms of text relevance analysis are not desirable for Web search, because they are susceptible to being fooled by "spamming"—that is, a devious Web page designer inserting into the page many copies of certain keywords, which are detected by the Web crawler but nevertheless invisible to the human reader. Spamming is likely not to be a problem however for a personal search engine over personal content. The user will certainly not spam him- or herself. Also, any files containing spam which find their way into the user's collection are dealt with by the user. Hence simple forms of text relevance analysis can be quite adequate for a personal search engine. However, more complex forms may also be used.

Next we address the similarity computer 205. This process also runs in the background. The problem of similarity measurement is very close to the text relevance problem. In the former, one is given a set of keywords and a document; and one tries to determine how relevant the document is to the concept represented by the keywords. For computing a similarity measure, one is given two documents, and must determine how much overlap there is between the concepts addressed in one document with the concepts addressed in the other. One embodiment of the present invention uses a parser 203 to examine documents 201 pairwise in the background process. The parser recognizes the words in the pair of documents, and feeds its results to the similarity computer 205.

Measuring concepts is far more challenging than parsing and counting keywords. However (again), there exist simple methods which are adequate for a personal search engine. The following is a simple method for similarity measurement which will be used in one embodiment of the invention.

Start with the "dictionary", namely, the set of words which is used in the inverted index. These are the useful words which are found in the files. (Examples of non-useful words are "stop" words such as: the, and, he, if, etc.) Then, for each word w and for each file f, the parser counts the number of times $N_f(w)$ that word w occurs in file f. Then divide $N_f(w)$ by $N_f$—the total number of words in the file—denoting the result $n_f(w)$. The term $n_f(w)$ is called the "word profile" of file f.

The similarity $S(1,2)$ between file 1 and file 2 is defined as follows:

$$S(1, 2) = K \sum_w \sqrt{n_1(w)n_2(w)}.$$

Here the constant K is another tuning parameter, which sets the scale of the similarity measures. In a preferred embodiment of the invention, the constant K is 1. In this case, the similarity is a positive number between zero and one. Furthermore, the similarity of two identical files, for K=1, is exactly 1.

As noted above, simplicity is not necessarily a disadvantage in searching and navigating over a personal file system. Spamming of word frequencies is in any case not expected to be a problem.

Every file in the system 201 will have a similarity weight with respect to every other file. Thus one might expect the graph formed from the similarity links to be complete. (For a complete graph, every node (document) is linked to every other). However, it may happen that the similarity weight for two files can be exactly zero (when the two files have no dictionary words in common). One can expect such cases to be rare. However, if there are any similarity links with zero weight, then the similarity graph ceases to be complete. (It remains non-negative—i.e., all similarity links have a positive or zero weight.) Completeness of the graph is not however a necessary condition for obtaining a positive link analysis weight for all nodes. Instead, the necessary condition is that the graph be "strongly connected". In a strongly connected graph, for any two nodes A and B, there is at least one path from A to B, and at least one path (not necessarily the same path) from B to A. A symmetric graph, such as the similarity graph, will be strongly connected as long as it is connected—that is, as long as the graph cannot be broken up into disconnected pieces, with no links between the pieces.

The occurrence of zero similarity measure is expected to be so rare that the similarity graph will always be connected, and hence strongly connected. As a backup measure, however, in one embodiment of the invention, one can impose a minimum similarity measure $\delta > 0$. That is, when $$K \sum_w \sqrt{n_1(w)n_2(w)} < \delta,$$

one can set $S(1,2)=\delta$. This ensures that the similarity graph is complete, and hence connected.

The similarity measures are stored in the similarity database 207. Now one can address the addition of directed hyperlinks—which, in combination with the similarity links, form the basis for the link analysis 213. The (undirected) similarity links, along with the directed hyperlinks, form a hybrid Web connecting the documents 201.

One embodiment of the invention allows the user 217, at any time, to lay in hyperlinks, using the manual interface of the hyperlink generator 209. As shown in FIG. 1, these hyperlinks can be anchored in text in the pointing document, and/or in the pointed-to document. They can also be non-anchored hyperlinks, which point from File A to File B. All such manually generated hyperlinks are stored in the hyperlink DB 211. As noted above, these hyperlinks are given a weight HLW—which, in one embodiment of the invention, is one. In another embodiment of the invention, the user may choose the value of HLW.

Hyperlinks are also generated automatically by the hyperlink generator 209, using an automatic interface to the files 201 which runs in the background. That is, the hyperlink generator can in some cases recognize that File A refers explicitly to File B. For example, in one embodiment of the invention, a mail file MF2 which is an answer to, or a forwarding of, another mail file MF1, will trigger the hyperlink generator to lay in a hyperlink pointing from MF2 to MF1. Automatically generated hyperlinks are also sent to the hyperlink DB 211.

Regarding the nature of the graph formed by the hybrid Web in the present invention, as noted above, the similarity links (for $\delta > 0$) form a complete graph, since every node (file) is connected to every other. (For $\delta = 0$, one can still expect the graph to be strongly connected.) Furthermore, the graph is weighted (with non-negative weights) and symmetric. When one-way hyperlinks are added to this graph, the resulting hybrid graph loses the property of symmetry; but it is still weighted, still non-negative, and still strongly connected. Since it is strongly connected, it has no sinks. (A sink in a directed graph is a set of nodes for which there is a way in, but no way out.) Sinks are undesirable for link analysis algorithms, as they make it impossible to compute a useful link analysis weight for all nodes. The PageRank algorithm, for example, inserts many extra artificial links so as to make the graph complete. Also, U.S. patent application Ser. No. 10/918,713, filed on Aug. 25, 2004, describes other kinds of "sink remedies" for graphs with sinks.

Here it is important to note that the hybrid graph has two properties which are sufficient to give a meaningful link analysis weight to every node: the hybrid graph is strongly connected, and its weights are non-negative. Hence no "sink remedy" is expected to be needed for this graph. Nevertheless, in those cases where such a remedy is needed, application of sink remedies such as those described in U.S. patent application Ser. No. 10/918,713 may be used.

Regarding the hyperlinks, there are two types.

Non-anchored hyperlinks. These are those hyperlinks from file A to file B which are not attached to any particular text in the pointing file A. (See for example item 2 in FIG. 1.) There is no technical problem to be solved in laying in such hyperlinks in a personal file system. The hyperlink becomes a type of metadata for file A. The target for the hyperlink (corresponding to the URL of a pointed-to Web page) is the path name for the pointed-to file. A path name is a standard object in file systems; it is used to specify a unique logical address for a file (which other utilities then translate into the physical blocks where the file is stored).

Hyperlinks anchored in the pointing file. These hyperlinks (item 1 in FIG. 1) can also be expressed as a form of metadata for the pointing file A. However, to be useful, hyperlinks which are anchored to text in the pointing file A should be displayed to the user, in the graphical presentation of file A that the user sees. Also, the display should be interactive—i.e., coupled to a user input (typically the mouse) so that the user can activate a jump to the pointed-to file. That is, the anchor text becomes an "active icon" by our above definition. Many file types (for example, pdf, Word, and PowerPoint files) support the expression of hyperlinks in this form.

Hyperlinks anchored in the pointed-to file. Some file types, such as html, allow for the anchoring of hyperlinks to a place in the text of the pointed-to file. For such file types it is straightforward to allow a hyperlink from file A to file B to point to a specific location in file B. (See item 5 in FIG. 1.)

All of these types of hyperlinks are stored in the hyperlink database 211. This database has entries of the form {A→B; HLW}, i.e., it lists all hyperlinks, and their weights, without regard to whether they are anchored or not. In an alternative embodiment of the invention, the anchor text (if any) in the pointing file and/or pointed-to file is also stored in the hyperlink DB; this information may be used in conjunction with keywords in a search.

Figure 3:
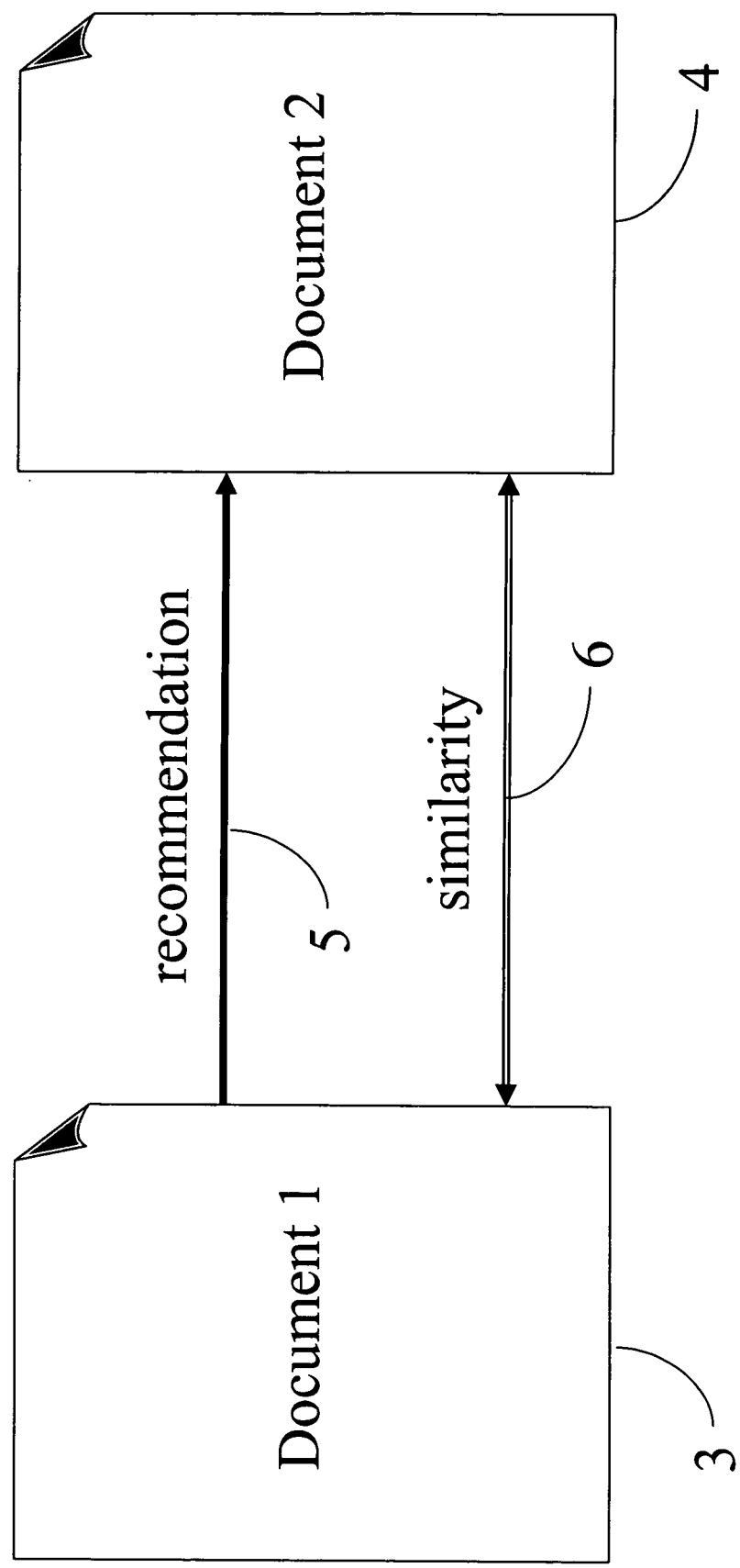
FIG. 3 is a representation of a hybrid Web according to one embodiment of the invention.

The hyperlinks, plus the similarity web, form the hybrid web. FIG. 3 shows two documents from the hybrid web. Document 1 (item 3) has a directed hyperlink 5 pointing to Document 2 (item 4). Also, as with all pairs of documents in the hybrid web, these two documents are related by an undirected similarity link 6. (Some similarity links may have zero weight.) This hybrid web (graph, with nodes=documents) is the starting point for link analysis (213 in FIG. 2). As noted above, the hybrid web is a form of directed graph (since it is not fully symmetric). Hence, methods of link analysis which are suitable for directed graphs may be used here.

Link popularity is not a suitable choice. The reason is that the similarity web, which makes up much of the hybrid web, gives each node (document) many links; hence it is not sensible to associate node importance (centrality) with number of links.

The preferred embodiment of this invention uses the algorithms described in U.S. patent application Ser. No. 10/687,602, filed on Oct. 29, 2003, for link analysis. There are actually two distinct algorithms in this patent application. Each has been shown, in tests, to give good results; yet the results are significantly different.

The two algorithms may be briefly termed 'Forward' and 'Backward'. These two methods differ when the graph is directed. Hence, in the extreme case in which the user lays down few or no hyperlinks, the graph is nearly symmetric, and the two methods will give nearly the same results.

Thus, one embodiment of this invention, which still gives good performance, is to use the Forward operator. Another embodiment of the invention calculates two link analysis weights (using both methods) for each document, and then presents the user with a choice of which result (or both) s/he wishes to see in the final, ranked results. This alternative embodiment is likely most suitable for a user with a strong and active interest in effective searching. Such a user is likely to lay in many hyperlinks (giving a meaningful difference between the two methods), and also to be interested in trying different algorithms, towards the goal of finding the best possible search results.

Finally, what occurs for a user who is at the opposite extreme. That is, suppose a user has no interest in hyperlinks—s/he wants good results in searching and navigating. Without hyperlinks, the hybrid graph becomes the (symmetric) similarity graph, plus the automatically generated hyperlinks. These latter links are likely to be a small minority of the total. Hence, in this case, the Forward and Backward methods give the nearly same results, which in turn are roughly equivalent to a method known from social science as 'eigenvector centrality'. Eigenvector centrality still gives a meaningful measure of importance; hence results will still be useful for this kind of user.

The link analysis module 213 also runs as a background process, i.e., it is not dependent on the initiation of a search. It takes as inputs the similarity DB 207 and the hyperlink DB 211. Its output is a set of link analysis scores LA, one for each document. These LA scores are stored in the link analysis scores DB 215.

The file quality score or FQS is stored for each file in the FQS DB 219. The scale of the FQS is not fixed by this invention; but any scale which is convenient for the user (e.g., from 1 to 10) is suitable, since the relative weights of FQS, similarity, and link analysis centrality will be determined by tuning parameters (see below). The FQS is determined both by user input 217 and by information from the Log component 240. In one embodiment of the invention, the user is prompted, each time s/he closes an opened file, for a choice of FQS for that file. In another embodiment, machine-readable measures such as dates and frequency of access may be used to alter FQS values from the default value. In any case, the user will always have the option of overwriting the FQS for any chosen file.

Returning to the description of the search process, recall that the user starts the search 225 with one or more keywords 223. The hit generator 235 then uses the keywords 223 and the inverted index 233 to generate an unranked hit list 237. This unranked hit list is fed to the text relevance computer 239, along with the keywords 223. The output of the text relevance computer is then a set of text relevance scores TR for each file on the hit list. These scores are stored in the text relevance scores DB 241.

Now one can rank the hits, based on three different scores. The merging module 229 fetches the text relevance scores from the relevance DB 241, the link analysis scores LA from the link analysis DB 215, and the FQS values FQS from the FQS DB 219. The net, composite, weight W for each hit is then $$W=a(TR)+b(LA)+c(FQS).$$

There appear to be three tuning parameters here; but since only relative weights matter for ranking, one of these three can be chosen completely freely; only the other two then influence the ranking results. In one embodiment of the invention, the user can choose the weight c—that is, the user can decide how much weight s/he wants to give to his/her own evaluations of the files.

The merging module calculates the net weight W according to the above formula. It then rearranges the hit list 237 into a ranked list, in order of decreasing net weight W. The resulting ranked list is truncated to a size 227 given by the search, and then stored in the merged ranking DB 231. These search results can then be presented in a suitable format, with (as with a Web search engine) the results presented as active icons which are linked to the corresponding file.

The present search procedure allows for a simple form of refinement of the search. That is, one can take the hit list of a previous search, and build the subgraph composed of all these hits and the links between them (both similarity links and hyperlinks). A new search over this subgraph will then give new results—even if the same keywords are input—because the link analysis will score the documents in the subgraph relative to one another. One can represent this change symbolically as follows: for each file, the link analysis score LA (based on the whole graph) will be replaced with a new link analysis score LA(sub) (which comes from performing link analysis on the subgraph defined by the hits). In any subsequent search which is restricted to the hits subgraph, new hits are thus ranked according to $$W=a(TR)+b(LA(\text{sub}))+c(FQS).$$

It can be very useful for a user to be able to refine a search in this way. After an initial search, the user can confine followup searches to a restricted universe of documents. This restricted universe is defined by a previous hit list, and is thus focused on a topic of interest. Note finally that this approach can be quite practical, as the subgraph is either not too large to begin with, or can be made of manageable size by truncation (keeping, for example, only the highest-ranked documents from the starting hit list). Hence iterated, refined searches, supported by real-time link analysis, can be practically implemented in the present invention.

Figure 4:
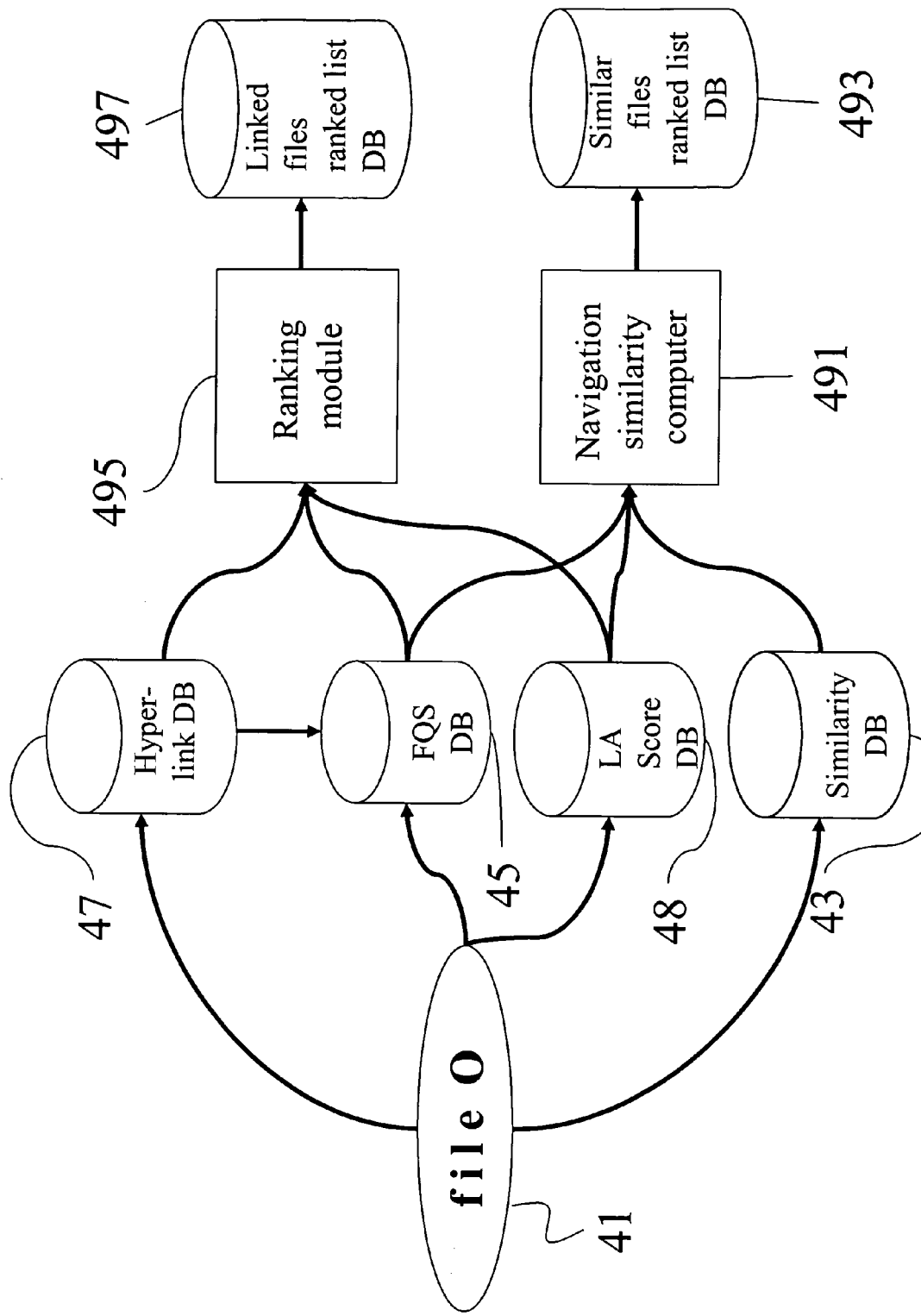
FIG. 4 is a flow diagram for navigation according to one embodiment of the invention.

This completes the description of the search process, and of the components involved (FIG. 2). FIG. 4 shows how the present invention aids in navigation. Assume the user has a file O open (41 in FIG. 4), and wishes to find related files. One method—already described in the above—is to click on any active icon (representing an anchored hyperlink) which appears in the display of the file. However, one can present three other sets of files, to which one may hop from the open file O: (i) all files which lie at the end of outbound hyperlinks from O; (ii) all files which point to O using inbound hyperlinks; and (iii) all files connected to O via similarity links. Each of these navigation options can be presented in a corresponding window, which is called up by invoking a "navigate" button.

All files which are connected to O by hyperlinks (in or out) may be fetched from the hyperlink DB 47. (This is the same database as that numbered 211 in FIG. 2.) One can rank these files (for navigation purposes) according to the weight HLW of the hyperlink connecting them to O; according to their FQS values; and also according to their link analysis scores LA. The FQS scores are fetched from the FQS DB 45 (219 in FIG. 2), and the LA scores are fetched from the LA score DB 48 (215 in FIG. 2). A suitable ranking parameter for navigation may then be defined by:

$$HNW=d(HLW)+e(LA)+f(FQS),$$

where 'HNW' stands for 'hyperlink neighbor weight', and d, e, and f are tuning parameters. The ranking module 495 then performs the ranking operation (based on the weights HNW) and sends the result to the linked files ranked list DB 497. The resulting ranked list of files may be presented as active icons, along with their FQS values, via an interface to the user. Thus the user can find and hop to the most important files which point to the open file O, or which are pointed to by the open file O.

There will always be many similarity links. However, they will be ranked, since the similarity scores S(1,2) may be expected to vary over a wide range. Furthermore, one can expect the user to be interested again—that is, in the context of navigation as well as of search—in measures of file quality as well as similarity—measures such as his/her own FQS scores for these files, and scores LA from link analysis. Hence one can rank the similarity-linked files according to all of these scores. A simple way of doing this is to define the similarity navigation weight SNW from O to file B to be $$SNW(O,B)=g\cdot S(O,B)+h\cdot LA(B)+m\cdot FQS(B).$$

The parameters g, h, and m are again tuning parameters.

The navigation similarity computer 491 thus takes inputs from the similarity DB 43 (207 in FIG. 2), the FQS DB 45 (219 in FIG. 2), and the LA score DB 48 (215 in FIG. 2), and generates the similarity navigation weight SNW for each file B. In one embodiment of the invention, the number of files fetched from the similarity DB is restricted, by only taking those files whose similarity to O is greater than some threshold value $S_{min}$.

Finally, given the similarity navigation weights SNW, the navigation similarity computer 491 ranks the resulting list of similar files B, and sends the result to the similar files ranked list DB 493. This list, again, may be presented as active icons, along with their corresponding FQS values, via an interface to the user.

Note that, in one embodiment of the invention, navigation can be restricted to a limited domain of files, just as search can. That is: the user may input one or more keywords in the navigation interface. These keywords are used, in real time, to generate a hit list as for search. This hit list then defines the nodes of a topic-focused subgraph.

In one embodiment of refined navigation, the scores SNW are not changed from their full-graph values—but the documents displayed in the ranked navigation list are taken solely from the nodes of the topic-focused subgraph, or in other words, from the hit list generated by the keywords.

In another embodiment of refined navigation, eligible neighbors of O are again restricted to those documents in the subgraph; but also link analysis scores LA(sub) are obtained, relative to the topic-focused subgraph, for each such eligible neighbor. These link analysis scores may then be used in ranking the linked files to be presented to the user, by generating the new neighbor weights as follows:

$$HNW(\text{sub})=d(HLW)+e(LA(\text{sub}))+f(FQS)$$

for hyperlink neighbors, and $$SNW(\text{sub})(O,B)=g\cdot S(O,B)+h\cdot LA(\text{sub})(B)+m\cdot FQS(B)$$

for similarity-linked neighbors.

Scenarios Other than Single User

In all of the above, the invention is described for use in a scenario in which there is a single user, who seeks help in searching and navigating through personal files. This scenario is common, and has a great unmet need. However the present invention may also be applied in other scenarios. The following discusses four other scenarios here, namely (i) small collaborative groups, (ii) network storage, (iii) enterprise search, and (iv) physical objects.

(i) Small Groups

A common situation with computer files is the case that the files are "nearly" personal—that is, only a small group of people has access to a given set of files. The people in this small group almost invariably have some sort of relation to one another—for example, a working relationship, or a family relationship—and the shared set of files is then relevant to that relationship.

Shared access comes in two forms: permission to read, and permission to write. The latter is a stronger permission than the former (since having write permission implies having read permission, but not vice versa). Hence a sensible way to define the set of files for a given small group is to choose that set for which the group has common read permission. Since both searching and navigating require only read permission, this definition ensures that every group member can search and navigate through the common set of files. We term this set of files the 'group files'.

There can of course be more than one such group, with all groups using a common file system (physical storage and logical path name structure). Then there can be several, possibly overlapping, sets of group files. Hence one can consider both the case of one group, and the case of several groups sharing a common file system. Each group must have some form of unique group ID (name), which we will call its gid.

One Group

First one can consider the case of a file system composed of a single group. Since the group set is defined by a common read permission, any process involving only reading of the files can be implemented essentially as for a single user. For example, those processes which do not require user input—in particular, the scanning and parsing of the files, the building up of the inverted index, the generation of similarity scores, the automatic updating of FQSs, and the automatic generation of hyperlinks—can be done on the entire set of files as with a single user. Any keyword search can then use the entire inverted index; and all files will be ranked in a common ranking scheme. Searching and navigating may then be done freely over the entire file system.

Differences from the single-user picture arise for operations requiring write permission. One embodiment of the above-described personal search engine has two such operations (beyond the obvious one of editing the files): the writing of hyperlinks, and the assigning of FQSs.

Hyperlinks are not a problem, as they are not exclusive in nature. That is, user-written hyperlinks are recommendations. Hence it is reasonable to allow all users with write permission for file F to lay in hyperlinks pointing from F to any file in the group set. This is the same situation as for the Web: it is allowed to recommend files to which one cannot write, and to lay the pointer in files to which one can write.

The ranking algorithm requires a single FQS; but one can assume that every user with write permission can have input to the FQS. Many solutions are possible for the generation of a composite FQS from several inputs. One solution is to store, for each file, one FQS for each user with write permission— storing the machine-determined value for those users giving no input—and then to take the average of these.

Figure 5:
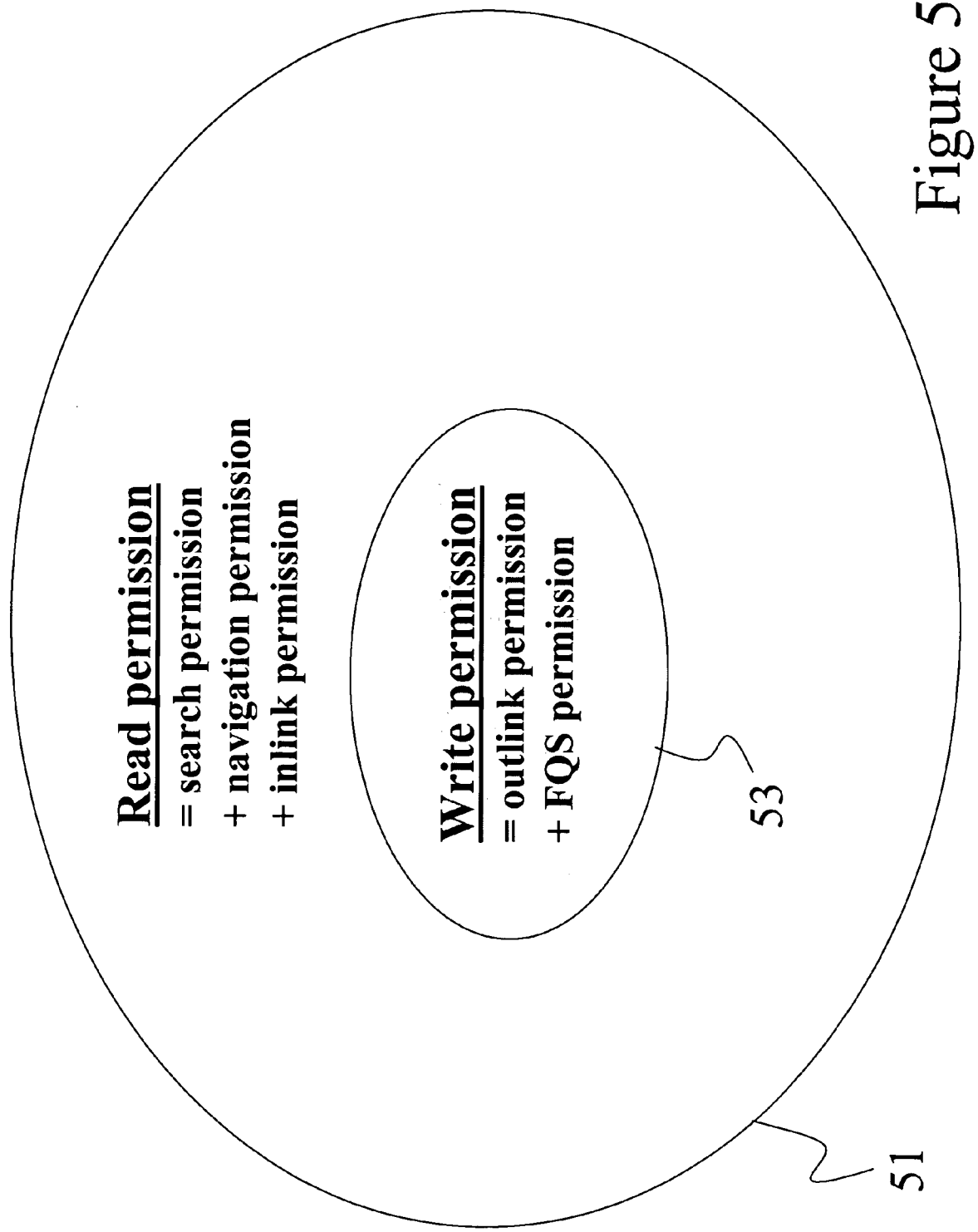
FIG. 5 is an illustration of a structure of a single group, from the perspective of a single user, according to one embodiment of the invention.

A picture of a single small group is shown in FIG. 5. The whole group 51 is defined by having common read permission. In one embodiment of the invention, read permission then entails permission to find the file in a search or navigation request, and permission to point to the file with a hyperlink. Each user will also have write permission for some subset 53 of the group files 51. For those files for which the user has write permission, s/he can lay in hyperlinks pointing from these files, and can also alter the FQS value for these files.

Finally in an alternative embodiment of the invention, all users with read permission may submit FQS values for a given file.

In summary, there are no significant problems with extending the above-described personal Web search engine embodiment to the case of one group with a few users.

Several Groups

Now one can assume that there are several groups sharing a single file system. One can assume that the groups' member lists can overlap, as can the sets of group files. However, in the spirit of this section, one can assume that there are not very many groups, nor very many users in total.

Both the inverted index and the similarity database can be implemented for the entire set of files as before—with the additional requirement of storing, for each file, the gids for the groups which have read permission for that file. The inverted index can for example have entries of the form:

keyword
    file1 gid1,gid2, . . .
    file2 gid5, gid7, . . .

while the similarity database can have entries of the form
    file1 gid1,gid2, . . . file2 gid5, gid7, . . . simscore(1,2).

(One can picture the same databases for a single group by removing all gid entries.)

With this database structure, a keyword search can always include the implicit requirement that, in addition to the keyword(s), at least one of the gids of the searcher must be present for a file to be included. Thus a user can only search through (i.e., only see hits from) those files for which s/he has read permission.

A similar statement holds for navigation. A user seeking navigation help will only see links (hyperlinks and similarity links—presented as active icons) to those files for which s/he has read permission.

Operations involving write permission are essentially like those for the one-group case. That is, regarding the laying of hyperlinks, it is allowed to recommend files which one can read but cannot write to, and to lay the pointer in files to which one can write. And FQSs can be handled in the same way as for the one-group case.

Finally one comes to the question of ranking of files. In the one-user case, ranking is based on comparing all files to one another, using text relevance, link analysis, and FQSs. Text relevance is the same, whether there is one user, or many users and groups; and the previous paragraphs discuss how to handle FQSs. For link analysis, there is a more complicated situation however. Because groups can overlap, and users can belong to more than one group, it can happen for some users that a hyperlink points from a file that user U can read, to one that U cannot read. Similarly, the similarity web spans all groups. In short, the different subgraphs for different groups will be connected by links. Furthermore, link analysis gives results which depend on properties of the whole graph. The problem then is to choose which 'whole graph' (i.e., which subgraph, taken from the entire graph) should be the starting point for link analysis, relative to a search by user U.

To rephrase the question: each user U wants to rank files. If the ranking were based on a single FQS-like score which is attached to each document, then the relative ranking of file A and file B would be independent of what other files are included in the ranked list. However, because of the nature of link analysis, changing the topology of the graph—by for example changing which files and links are present—can change the relative ranking of any two given files A and B. Therefore the question must be asked, for each user U, which is the 'reference set' of files that is to be used for producing link analysis weights LA?

The following discusses three possible answers:
1. Use the whole graph, i.e., that based on every file in the common file system.
2. Choose a truncated graph which is built from all files for which a single group has read permission.
3. Choose a truncated graph which is built from all files taken from all groups for which user U is a member with read permission.

Figure 6:
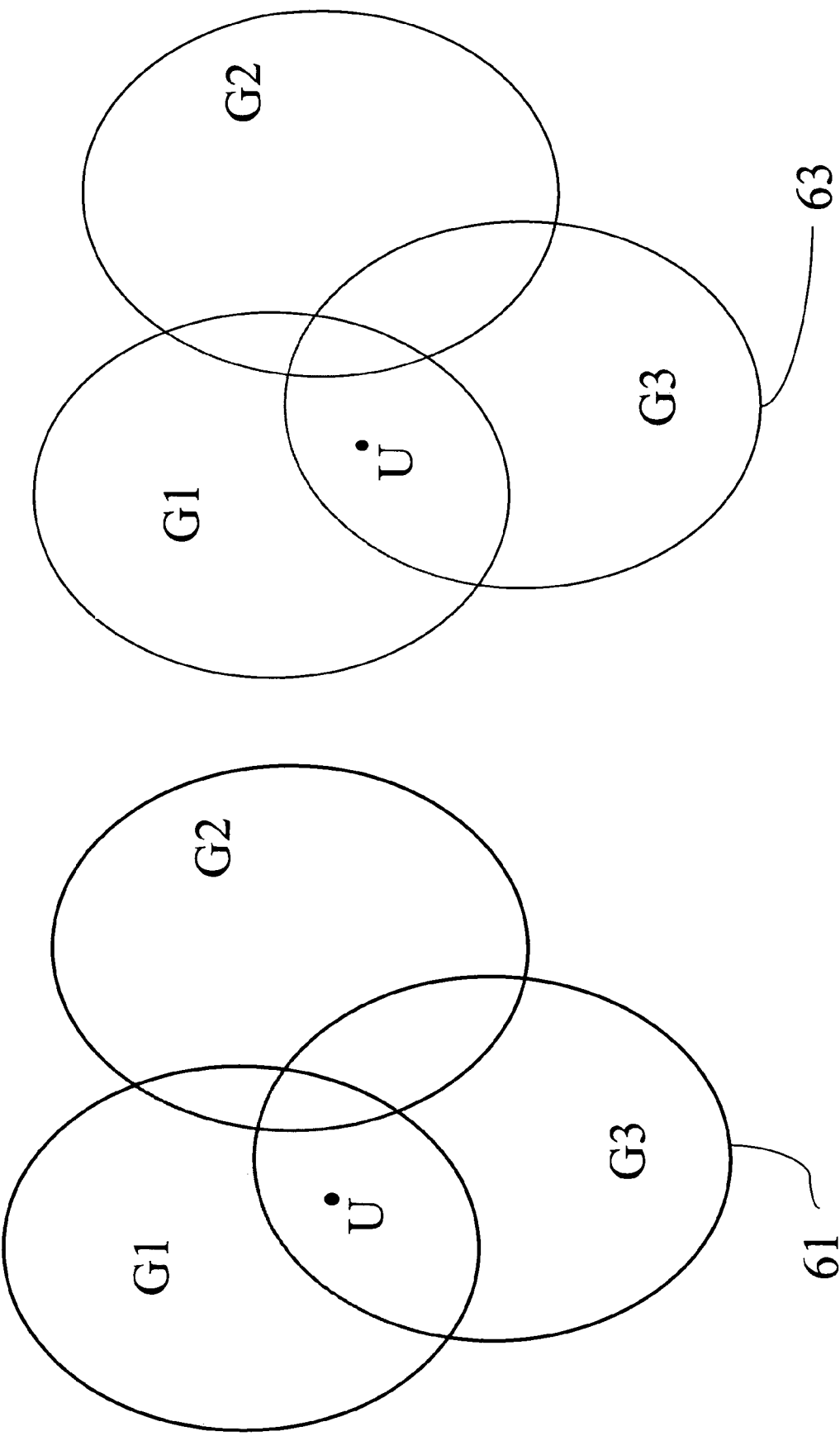
FIG. 6 is an illustration, according to one embodiment of the invention, of two possible ways of defining a subset of files, to be used for building a subgraph and performing link analysis, for the case of several groups.

FIG. 6 shows choices 2 and 3. In this figure, there are three groups (G1, G2, and G3) sharing files; and user U is a member of G1 and G3. The left-hand side 61 of FIG. 6 shows choice 2: the subgraph is built from all files (shaded) for which group G1 has read permission. On the right side 63 of FIG. 6, all files for which U has read permission (ie, files in groups G1 and G3) are shaded; these files are used to make a subgraph for user U.

Figure 7:
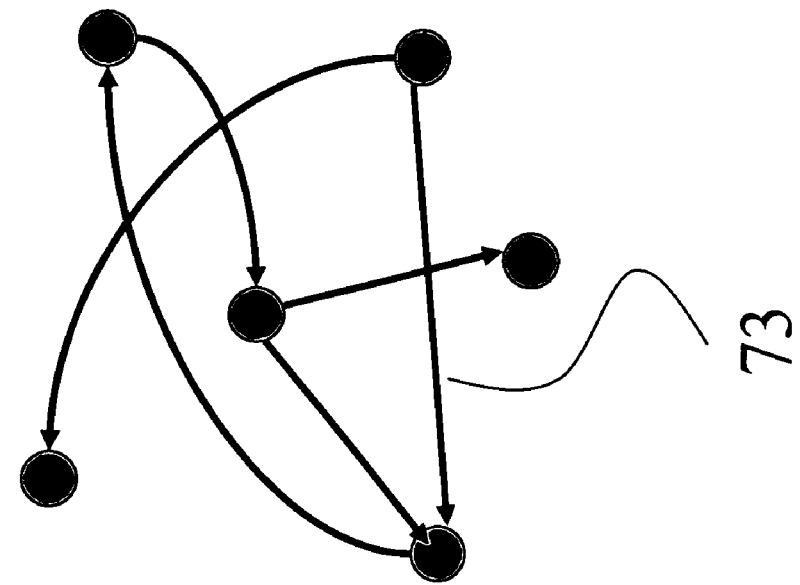
FIG. 7 is an illustration, according to one embodiment of the present invention, of two possible subgraphs to be used for link analysis for the case of several groups.
Figure 7:
Figure 7:
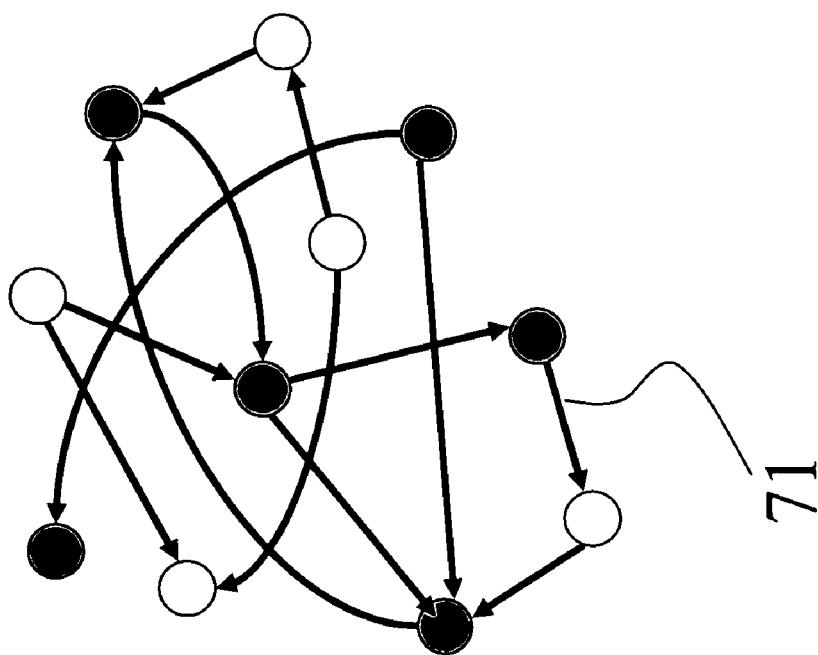

In FIG. 7, the process of truncating a graph is shown. Suppose that one wishes to build a subgraph only from the shaded nodes in the left-hand side 71 of FIG. 7; hence the white node, and all links connecting to the white nodes, must be removed. The result is shown in the right-hand side 73 of FIG. 7: only the shaded nodes, and the links connecting them, are retained in the truncated graph. For illustration, one can imagine that choice 3 is being used—so that the white files are files for which U does not have read permission, while U has read permission for the shaded files.

Choice 3 seems to suggest building a subgraph for each user. In fact, it amounts to building a subgraph for each combination of groups that some user is a member of. Often, more than one user will have the same combination of groups; also, often, there will be many combinations of groups which represent no user. Thus the number of subgraphs entailed by choice 3 will in general be less than either the total number of users, or the total number of possible combinations of groups.

The following is a discussion of the apparent advantages and disadvantages of each choice.

Choice 1 has the advantage that there is a single, unique link analysis weight LA for each node, obtained from the whole-graph link analysis. This reduces both the computational burden and the data storage requirements of link analysis. Furthermore, one can implement "hit filters", as described above, so that hit lists resulting from search and navigation queries only display files that user U may read.

On the other hand, if user U has read access to only a small number of files relative to the total, it may be that this user will get unsatisfying ranking results—all the files that s/he can see will receive link analysis weights LA which are computed relative to a large, invisible (to U) set of files. Hence choice 1 seems undesirable for this case—which may arise if there are very many groups of roughly equal size (in terms of number of files), or if there is a large disparity among the size of the groups. The former case is ruled out by assumption—in this section one can assume a small number of groups. However, even with a small number of groups and of users, it may happen that some users have read access only to a small fraction of the total set of files; and in such a case, choice 1 is likely to be unsatisfactory for such users.

Choice 3 requires several link analysis calculations—one for each combination of groups that represents some user. Hence both the computational and storage burdens of choice 3 are greater than those for choice 1. However, both this choice and choice 1 avoid the burden of computing a link analysis ranking for every search. Instead, one can update the LA scores whenever a change (or a sufficient number of changes) occurs in the set of files and/or links for the relevant subgraph. Also, if there are not many users, then there are not many combinations of groups for which the link analysis calculation must be done.

The advantage of choice 3 is that each user gets a ranking that considers only and all files that that user can see. This is probably a desirable feature for most searches. Hence one finds that choice 3 is likely a good choice, whenever there are sufficient computational and storage capacities to support this choice.

One can also imagine cases for which choice 2 is advantageous. Suppose for example that a user U has both family- and job-related files, and groups, residing on the same file system; that the keywords which U can think of give files that are found both in the family group, and in one or more job groups; and that U only wants to search family-related files. In this case, it may be easy and effective to narrow the search by specifying only the family group—that is, by using choice 2. Thus one can see (also see FIG. 6) that choice 2 offers a novel way of focusing a search.

(ii) Network Storage

Now one can consider the case that the personal files in question are not stored on a single private PC. Instead, they are stored by a commercial provider of such services. Examples, which exist now, are a portal such as Yahoo, or a search provider such as Google. These firms currently only offer to store mail files; but it is a short step from there to offering storage of all kinds of personal files. This kind of storage is called 'network storage'.

One advantage of network storage is reliable backup. Another is the fact that one can access such files from anywhere in the world that has Internet access. Also, using network storage makes it easy to set up the kinds of small-group sharing described in the previous section. For instance, families can store photo albums, which are then accessible by any member of the defined family group, from any of several homes, and also by traveling family members.

Thus, network storage of personal files allows for higher mobility—the content is not pinned to a single hard disk—rather, they are available to the user wherever and whenever the user has network access. In this sense, network storage of files is the analog (for content) of the mobile telephone: the connection stays with the user, not with the device. And in fact this reasoning suggests a promising use of the current invention, when applied to personal files stored on the network: access to these files, including search and navigation services over them, may be made accessible, using a suitable interface, via a mobile telephone or WLAN-equipped device.

Yet another advantage of network storage is that the storage provider can offer ancillary services—such as the search and navigation services described in the present invention—to the user. This frees the user from the current near-monopoly situation in which s/he must wait for Microsoft to introduce the desired feature. Furthermore, the user can take advantage of such new services in a painless way, without having to buy and learn an entirely new operating system—and with no chance of being confronted with a new monopoly.

Next the technical considerations involved in providing search and navigation are addressed, using the ideas in the present invention, for personal files with network storage. The main point to make here is that all of the previous technical considerations are essentially independent of where the files are physically stored. Hence one can consider the search and navigation technology described thus far in this section—both the single-user case and the small-group case—to be applicable to network storage, as well as to storage on a single PC.

One can see at least one technical advantage of network storage over private-PC storage for search and navigation. That is, one can expect economies of scale to be realized in the former case. For instance, software for text relevance analysis, similarity calculation, and link analysis need not be present on every PC. Also, the databases involved may be impractically large for a single PC; and/or there may be more efficient ways of storing many such personal databases at a single centralized installation.

Picture files are one of the most likely applications of network storage. Picture files are large; users have an appetite for large numbers of them; and there is a clear need for good management tools to help such users in organizing, finding, and navigating among these files. Hence picture files are briefly discussed here. One should note that most of the following discussion also holds for other kinds of non-text files, such as videos or music files; but for brevity the following discusses pictures.

All of the previous discussion has been aimed at text or text-based files. In particular, search in the present invention is guided by keywords and the inverted index. The present invention is then applicable to picture files, only if these files have metadata in the form of text (or which may at least be recognized as text by a parser). This is a limitation that appears to be shared by all existing systems for searching through picture files.

Future technology may be expected to offer one or both of the following developments: (i) software to improve, for the user, the ease of the writing of metadata for picture files; or (ii) software to automate the writing of metadata, by machine analysis of the pictures. The first improvement is certain to happen. A development which is similar to the second is the recent progress by StreamSage in using machine voice analysis to generate text from video files. Machine analysis of pictures is a more difficult problem, which is expected to give progress at a slower rate.

In short: as long as the input by the user is in the form of words, searching through picture files (and other kinds of non-text files such as videos and music files) will be dependent on metadata. The present invention thus depends on some component—an interactive interface, or a more sophisticated approach—to provide that metadata for pictures. Given that metadata, it is then straightforward to build the inverted index and the similarity web.

Two other aspects of the present invention are independent of the nature of the file involved. First, the use of FQSs is independent of the nature of the file; hence they can be used with picture files as with any other. Second, users can lay down hyperlinks pointing to and from picture files. However, the notion of anchoring hyperlinks to relevant text may not be useful when the only text is metadata.

In summary: assuming a mechanism to provide metadata, picture (and other non-text) files may still be incorporated into the hybrid personal web described here, with similarity links, manual and/or automatic hyperlinks, and file quality scores, to aid in both search and navigation. Note also that there is no need to build a separate web for the non-text files: as long as one has meaningful metadata for non-text files—even if only a few words—useful similarity scores can still be computed, on the same scale as all other similarity scores.

(iii) Enterprise Search

The present invention has been discussed so far in terms of private users or small groups. Enterprise search has however many common aspects with these previously discussed cases. Hence, for completeness, one must consider the possibility of using the present invention in the context of enterprise search here. Thus, one may focus on the set (presumably large) of documents that are readable by all members of the company, as the case of smaller and more restricted groups has been discussed above.

The enterprise search environment is similar to the Web in that (for many if not most files), there are many users with read permission, but still relatively few with write permission. Logistically, then, it seems that conditions are right for the application of user-written (recommending) hyperlinks: many users, each able to comment on (recommend) many files. Also, as with the Web, not all files are readable by all users; but many are.

It seems that the principal difference between Web search and enterprise search is the motivation of these many users. That is, writers of Web pages are motivated to lay down hyperlinks, and not only to their own pages; while it is not clear that writers of documents for the enterprise have the same motivation. It is difficult to answer this question however without giving these users the opportunity to lay down hyperlinks themselves.

If this picture is correct, then a hybrid web such as described in the present invention may offer an excellent way to bridge the transition from non-participatory to participatory enterprise search. A search and navigation system which is guided by a similarity web, by automatically-generated hyperlinks, and by user-written hyperlinks allows for a painless startup—since the similarity links and the automatic hyperlinks already provide a great deal of aid in both search (ranking) and navigation. Users who use this system may also learn that they themselves benefit by laying down hyperlinks to files that they perceive as valuable. In this fashion, conceivably, a strong level of participation in the laying down of hyperlinks may be built up gradually, with the similarity links providing the foundation to get the process started.

It also seems that, in this picture, the use of FQSs is not necessary. Also, FQSs have disadvantages in this many-user, few-write, many-read environment: for example, who gets to score a given file? And how does one avoid "spam" scores supporting one's own files? FQSs are useful and needed when it is not logistically possible to use hyperlinks to perform completely the recommending function. In the case of enterprise search, the logistics are right for hyperlinks; it is rather a question of building up a culture of use for them. The hyperlinks themselves offer a decentralized, democratic, participatory way for users to express their recommendations—and the hyperlinks have the further advantage of forcing the user to place the recommendation in the context of the pointing file.

(iv) Physical Objects

Another application of the present invention is in the support of searching and navigating through a set of physical objects.

The basis for this idea is as follows. Technologies such as RFID (radio frequency identification) tags allow for large numbers of physical objects to be tagged with electronically readable metadata. Reading such metadata gives one a digital representation of the collection of physical objects. Hence one can apply the present invention to searching through this collection, in much the same way as discussed for non-text files (such as pictures) above. All of the features of the hybrid web may be employed: the similarity web, hyperlinks expressing recommendation, and quality scores for each object. The resulting hybrid web may be used for both search and navigation as described above.

As an illustrative example, consider the case of a store selling wines at the retail level. When presented with a customer request—where the customer is open to more than one possible wine—the store employee may use the search engine described here to bring up a ranked list of wines matching the customer's criteria. The ranking may be based on "text relevance" (the degree of match to the customer's request), link analysis, and quality scores. Link analysis may incorporate both types of links: similarity links (generated using the metadata), and hyperlinks. The latter again express recommendation, and may be laid in by knowledgeable humans, who can, given a wine (or an accompanying dish), recommend other wines that are also likely to be of interest.

Finally, navigation is also possible in this context. Given an object (a type of wine), one may be interested in information on other wines, which are related to the given wine by similarity or recommendation.

Figure 8:
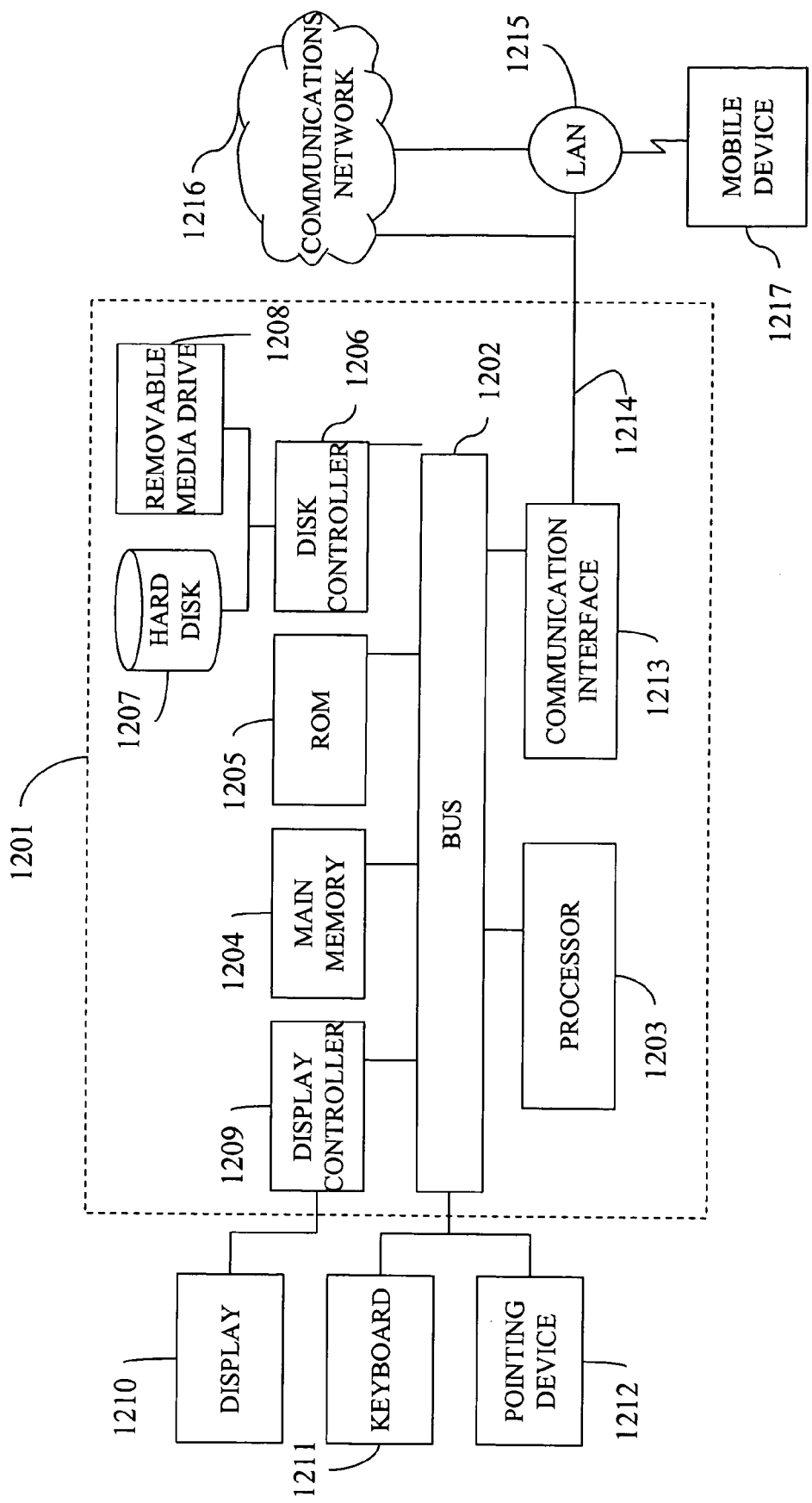
FIG. 8 is a block diagram of a computer used in one embodiment of the invention.

FIG. 8 illustrates a computer system 1201 upon which an embodiment of the present invention may be implemented. Computer design is discussed in detail in STALLINGS, W., Computer Organization and Architecture, 4th ed., Upper Saddle River, N.J., Prentice Hall, 1996, the entire contents of which is incorporated herein by reference. The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a cathode ray tube (CRT), for displaying information to a computer user. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the invention in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other physical medium from which a computer can read.

Stored on any one or on a combination of computer readable media, the present invention includes software for controlling the computer system 1201, for driving a device or devices for implementing the invention, and for enabling the computer system 1201 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices stored on a computer readable medium of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire, and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214, and the communication interface 1213. Moreover, the network link 1214 may provide a connection through a LAN 1215 to a mobile device 1217 such as a personal digital assistant (PDA) laptop computer, or cellular telephone.

A successful implementation of the invention, on personal PCs, on private contents stored on the network, or on enterprise document systems, will enable users to more effectively search for relevant documents in a manner comparable to searching and navigating on the World-Wide Web. The present invention represents the bridging building block to a full utilization of link analysis-based ranking, along with link-based navigation, in any environment which currently lacks a link structure.

The present invention also can be applied to distributed (network) storage of personal content. Envision a network storage that the user can access from any type of terminal, and that the network operator administrates and backs up. The user can upload all his/her content (pictures, documents, presentations, videos, MP3s, etc) to this network storage. The present invention represents a key ingredient in implementing a search and navigation application, using link analysis-based ranking to search a user's content in the network storage. The present invention may also provide a new and significantly better way to do enterprise search.

Numerous modifications and variations of the present invention are possible in light of the above teachings. It is therefore to be understood that within the scope of the appended claims, the invention may be practiced otherwise than specifically described herein.

The invention claimed is:

1. A method for searching electronic material stored in a computing environment using a computer, comprising:
providing a plurality of documents;
determining, using the computer, an undirected, weighted link between at least two of said plurality of documents, based on similarity;
determining, using the computer, a directed, weighted link between at least two of said plurality of documents;
adding said determined undirected, weighted links to said determined directed, weighted links to create a hybrid web having links; and
performing, using the computer, a link analysis algorithm taking the links of said hybrid web as its input, said algorithm including at least one of forward link analysis and backward link analysis, wherein
the output of said algorithm is a set of link analysis scores.

2. The method according to claim 1, wherein said algorithm is eigenvector based.

3. The method according to claim 1, wherein said at least one of forward and backward link analysis comprises using at least one of a non-compound Forward operator and a non-compound Backward operator.

4. The method according to claim 1, wherein said at least one of forward and backward link analysis comprises using at least one of a non-normalized Forward operator and a non-normalized Backward operator.

5. The method of claim 1, further comprising:
scoring each of said at least two documents via at least one of text relevancy analysis and file quality analysis.

6. The method of claim 1, wherein the step of determining a directed, weighted link between at least two of said plurality of documents includes establishing a hyperlink between a first document and a second document, wherein said step of establishing a hyperlink comprises one of:
anchoring said hyperlink in text of one of said first and second documents, linking said first and second document with an unanchored hyperlink, wherein said step of establishing a hyperlink further comprises one of:
entering said hyperlink via an input terminal, and establishing said hyperlink automatically.

7. The method of claim 6, wherein said directed, weighted link may or may not be anchored to text on a pointing or a pointed-to document.

8. The method of claim 6, further comprising:
storing hyperlink information (pointing file, pointed-to file, hyperlink weight, and anchoring text) in a link structure database.

9. The method of claim 1, wherein said at least one of forward link analysis and backward link analysis comprises:
determining an authority-like score for a document using a non-compound, non-normalized Forward operator and not using a Backward operator; and
determining a hub-like score for a document using a non-compound, non-normalized Backward operator and not using a forward operator such that said steps of determining an authority-like score and determining a hub-like score are mathematically decoupled.

10. The method of claim 5, further comprising:
crawling a file system;
scanning text of files within said file system; and
building an inverted index.

11. The method of claim 10, further comprising:
comparing documents pairwise; and
developing a similarity score.

12. The method of claim 11, further comprising:
storing said similarity score in a similarity score database.

13. The method of claim 11, wherein said step of comparing documents pairwise comprises:
counting a number of times $N_f(w)$ that a word w occurs in a document f; and
dividing $N_f(w)$ by a total number of words in the document $N_f$ to develop a profile of document $f^{n_f(w)}$.

14. The method of claim 13, wherein said step of developing a similarity score comprises:
calculating a similarity S(1,2) between a first document and a second document as follows:

$$S(1,2) = K \sum_w \sqrt{n_1(w) n_2(w)}$$

where K is a tuning parameter.

15. The method of claim 14, further comprising:
establishing a minimum similarity measure δ>0 so that when $$K \sum_w \sqrt{n_1(w) n_2(w)} < \delta, \quad S(1,2) = \delta.$$

16. The method of claim 5, wherein said text relevancy analysis comprises:
scoring a document on the basis of a relevance to a set of keywords.

17. The method of claim 5, wherein said file quality analysis comprises:
assigning a default value to a file quality score.

18. The method of claim 17, further comprising:
automatically or manually adjusting said file quality score.

19. The method of claim 18, wherein said step of adjusting comprises:
determining when a file was last opened or edited; and
assigning a higher file quality score to a file which is opened or edited recently.

20. The method of claim 18, wherein said step of adjusting further comprises:
logging a number of times a file is opened or edited over a period of time; and
assigning a higher file quality score to a file which is opened or edited frequently.

21. The method of claim 5, further comprising:
inputting a keyword into a search interface;
feeding the keyword to a hit list generator; and
outputting a hit list of same hits, accompanied by a corresponding list of text relevance scores.

22. The method of claim 21, further comprising:
crawling a file system;
scanning text of files within said file system; and
building an inverted index.

23. The method of claim 22, wherein said step of outputting a hit list of same hits comprises:
using the keyword to extract said hit list from said inverted index.

24. The method of claim 22, wherein said inverted index includes text extracted from metadata of non-text files.

25. The method of claim 21, said step of calculating an importance score comprising:
calculating an importance score W for each document, wherein $$W = a(TR) + b(LA) + c(FQS)$$

TR=text relevance score from text analysis,
LA=link analysis score,
FQS=file quality score, and
a, b, and c are tuning parameter weights.

26. The method of claim 25, further comprising:
adjusting any of the weights a, b, or c.

27. The method of claim 26, further comprising:
rearranging said hit list into a ranked list.

28. The method of claim 27, further comprising:
truncating said ranked list.

29. The method of claim 28, further comprising:
displaying said ranked list.

30. The method of claim 23, further comprising:
inputting a second keyword into a search interface;
feeding the second keyword to said hit list generator; and
outputting a second hit list of same hits, accompanied by a corresponding second list of text relevance scores.

31. The method of claim 30, wherein said step of outputting a hit list of same hits comprises:
using the second keyword to extract said second hit list from said inverted index.

32. The method of claim 31, further comprising:
forming a subgraph from said second hit list and all links among the documents in said second hit list,
obtaining restricted link analysis scores LA (sub) for each of said documents in said second hit list by performing link analysis on the subgraph, and
said step of calculating an importance score including calculating a second importance score W for each document, wherein $$W = a(TR) + b(LA(\text{sub})) + c(FQS)$$

TR=text relevance score from text analysis,
LA (sub) subgraph link analysis score,
FQS=file quality score, and
a, b, and c are tuning parameter weights.

33. The method of claim 32, further comprising:
adjusting any of the weights a, b, or c.

34. The method of claim 33, further comprising:
rearranging said second hit list into a second ranked list.

35. The method of claim 34, further comprising:
truncating said second ranked list.

36. The method of claim 35, further comprising:
displaying said second ranked list.

37. The method of claim 5, further comprising:
navigating between documents scored in said scoring step.

38. The method of claim 37, wherein said step of navigating comprises:
starting at a start file O, said start file O being one of an initial file or a currently open file.

39. The method of claim 38, wherein said step of navigating further comprises:
identifying neighbors B of the start file O, said neighbors B having a similarity score S(O,B) with respect to file O which is greater than a threshold value $S_{min}$.

40. The method of claim 39, wherein said similarity score S(O,B) is non-zero.

41. The method of claim 38, wherein said step of identifying neighbors B comprises:
identifying neighbors of the start file O, said neighbors B having at least one of:
a directed link pointing from B to O, and
a directed link pointing from O to B.

42. The method of claim 39, wherein said step of navigating further comprises:
comparing documents pairwise; and
developing a similarity score.

43. The method of claim 42, wherein said step of comparing documents pairwise comprises:
counting a number of times $N_f(w)$ that a word w occurs in a document f; and
dividing $N_f(w)$ by a total number of words in the document $N_f$ to develop a profile of document $f^{n_f(w)}$.

44. The method of claim 43, wherein said step of developing a similarity score comprises:
calculating a similarity S(1,2) between a first document and a second document as follows:

$$S(1,2) = K \sum_w \sqrt{n_1(w)n_2(w)}.$$

45. The method of claim 44, further comprising:
establishing a minimum similarity measure $\delta \leq 0$ so that when $$K \sum_w \sqrt{n_1(w)n_2(w)} < \delta, \quad S(1,2) = \delta.$$

46. The method of claim 42, further comprising:
storing said similarity score in a similarity score database.

47. The method of claim 46, further comprising:
calculating a similarity navigation score SNW(O,B), where $$SNW(O,B) = g \cdot S(O,B) + h \cdot LA(B) + m \cdot FQS(B),$$

LA(B) is the link analysis score of B, FQS(B) is the file quality score of B, and g, h, and m are tuning parameters.

48. The method of claim 47, further comprising:
ranking similarity-linked files to provide ranked similarity-linked files.

49. The method of claim 48, further comprising:
truncating said ranked similarity-linked files.

50. The method of claim 49, further comprising:
displaying said ranked similarity-linked files.

51. The method of claim 50, further comprising:
jumping to a similarity-linked file.

52. The method of claim 39, further comprising:
inputting keywords,
obtaining a hit list for said keywords, and
restricting the neighbors to be displayed to those neighbors which are found on the hit list.

53. The method of claim 52, further comprising:
forming a subgraph from said hit list and all links among the documents in said hit list,
obtaining restricted link analysis scores LA (sub) for each of said documents by performing link analysis on said subgraph, and
ranking the neighbors according to the subgraph similarity neighbor score $$SNW(\text{sub})(O,B) = g \cdot S(O,B) + h \cdot LA(\text{sub})(B) + m \cdot FQS(B),$$

where g, h, and m are tuning parameters.

54. The method of claim 53, further comprising:
ranking similarity-linked files to provide ranked similarity-linked files.

55. The method of claim 54, further comprising:
truncating said ranked similarity-linked files.

56. The method of claim 55, further comprising:
displaying said ranked similarity-linked files.

57. The method of claim 56, further comprising:
jumping to a similarity-linked file.

58. The method of claim 41, further comprising:
establishing a hyperlink between a first document and a second document, wherein said step of establishing a hyperlink comprises one of:
anchoring said hyperlink in text of one of said first and second documents, and
linking said first and second document with an unanchored hyperlink, wherein
said step of establishing a hyperlink further comprises one of:
entering said hyperlink via an input terminal, and
establishing said hyperlink automatically.

59. The method of claim 58, wherein said directed, weighted link may or may not be anchored to text on a pointing or a pointed-to document.

60. The method of claim 58, further comprising:
storing hyperlink information (pointing file, pointed-to file, hyperlink weight, and anchoring text) in a link structure database.

61. The method of claim 60, further comprising:
identifying a hyperlink neighborhood of a start file O, said hyperlink neighborhood being composed of at least one of:
all files B having directed links pointing to O, and
all files B which are pointed to by O.

62. The method of claim 61, wherein a hyperlink neighbor score (HNW) is calculated for each file in said hyperlink neighborhood, according to the following formula:

$$HNW = d(HLW) + e(LA) + f(FQS),$$

where HLW=a hyperlink weight, LA is a link analysis score for the neighbor, FQS equals a file quality score for the neighbor, and d, e, and f are tuning parameters.

63. The method of claim 62, further comprising:
ranking said hyperlink neighborhood according to a corresponding hyperlink neighbor score.

64. The method of claim 63, further comprising:
truncating said hyperlink neighborhood.

65. The method of claim 64, further comprising:
displaying said hyperlink neighborhood.

66. The method of claim 65, further comprising:
jumping to a file within said hyperlink neighborhood.

67. The method of claim 61, further comprising:
inputting a keyword,
obtaining a hit list for said keyword, and
restricting neighbors to be displayed to those neighbors which are found on the hit list.

68. The method of claim 67, further comprising:
crawling a file system;
scanning text of files within said file system; and building an inverted index.

69. The method of claim 68, wherein said step of obtaining a hit list comprises:
using the keyword to extract said hit list from said inverted index.

70. The method of claim 68, wherein said inverted index includes text extracted from metadata of non-text files.

71. The method of claim 69, further comprising:
forming a subgraph from said second hit list and all links among the documents in said second hit list,
obtaining restricted link analysis scores LA (sub) for each of said documents in said second hit list by performing link analysis on the subgraph, and
ranking the neighbors according to the subgraph hyperlink neighbor score $$HNW(sub)=d(HLW)+e(LA(sub))+f(FQS),$$

where HLW = a hyperlink weight, and d, e, and f are tuning parameters.

72. The method of claim 71, further comprising:
ranking said hyperlink neighborhood according to a corresponding subgraph hyperlink neighbor score.

73. The method of claim 72, further comprising:
truncating said hyperlink neighborhood.

74. The method of claim 73, further comprising:
displaying said hyperlink neighborhood.

75. The method of claim 74, further comprising:
jumping to a file within said hyperlink neighborhood.

76. The method of claim 21, further comprising:
searching shared-access files of one or more defined groups co-hosted in a common environment;
searching files which are stored on a network;
searching files of an enterprise; and
searching physical objects.

77. The method of claim 37, wherein said step of navigating comprises:
navigating among shared-access files of one or more defined groups co-hosted in a common environment;
navigating among files which are stored on a network;
navigating among files of an enterprise; and
navigating among physical objects.

78. The method of claim 76 or claim 77, wherein accessing said shared-access files of one or more defined groups comprises:
connecting a first subgraph of said one or more defined groups with a second subgraph of said one or more defined groups.

79. The method of claim 78, further comprising:
establishing hyperlinks which point from a selected file; and
modifying a file quality score of the selected file, wherein said steps of establishing and modifying are restricted to a user with write permission for the selected file.

80. The method of claim 79, wherein said step of modifying a file quality score comprises:
averaging a plurality of file quality scores.

81. The method of claim 79, further comprising:
modifying said file quality score by any user having file read permission.

82. The method of claim 79 wherein said user is a member of at least two groups each with distinct read and write privileges.

83. The method of claim 82, further comprising:
performing link analysis of a graph that encompasses all documents available to said at least two groups.

84. The method of claim 82, further comprising:
performing link analysis of a subgraph that encompasses all documents available to a first of said at least two groups under a corresponding first read permission; and
performing link analysis of a subgraph that encompasses all documents available to a second of said at least two groups under a corresponding second read permission.

85. The method of claim 82, further comprising:
performing link analysis of a subgraph that encompasses all documents available to a user.

86. A tangible computer readable storage medium having stored thereon a program that when executed performs a method of searching electronic material stored in a computing environment, said method comprising:
providing a plurality of documents;
determining an undirected, weighted link between at least two of said plurality of documents, based on similarity;
determining a directed, weighted link between at least two of said plurality of documents;
adding said determined undirected, weighted links to said determined directed, weighted links to create a hybrid web having links; and
performing a link analysis algorithm taking the links of said hybrid web as its input, said algorithm including at least one of forward link analysis and backward link analysis, wherein
the output of said algorithm is a set of link analysis scores.

87. The tangible computer readable storage medium according to claim 86, wherein said algorithm is eigenvector based.

88. The tangible computer readable storage medium according to claim 86, wherein said at least one of forward and backward link analysis comprises using at least one of a non-compound Forward operator and a non-compound Backward operator.

89. The tangible computer readable storage medium according to claim 86, wherein said at least one of forward and backward link analysis comprises using at least one of a non-normalized Forward operator and a non-normalized backward operator.

90. The tangible computer readable storage medium of claim 86, further comprising instructions for:
scoring each of said at least two documents via at least one of text relevancy analysis and file quality analysis.

91. The tangible computer readable storage medium of claim 86, wherein the instructions for determining a directed, weighted link between at least two of said plurality of documents includes instructions for establishing a hyperlink between a first document and a second document, wherein said instructions for establishing a hyperlink comprises instructions for one of:
anchoring said hyperlink in text of one of said first and second documents,
linking said first and second document with an unanchored hyperlink, wherein said instructions for establishing a hyperlink further comprises instructions for one of:
entering said hyperlink via an input terminal, and
establishing said hyperlink automatically.

92. A search device configured to search electronic material stored in a computing environment, comprising:
means for providing a plurality of documents;
means for determining an undirected, weighted link between at least two of said plurality of documents, based on similarity;
means for determining a directed, weighted link between at least two of said plurality of documents;
means for adding said determined undirected, weighted links to said determined directed, weighted links to create a hybrid web having links; and
means for performing a link analysis algorithm taking the links of said hybrid web as its input, said algorithm including at least one of forward link analysis and backward link analysis, wherein
the output of said algorithm is a set of link analysis scores.

93. The search device according to claim 92, wherein said algorithm is eigenvector based.

94. The search device according to claim 92, wherein said at least one of forward and backward link analysis comprises using at least one of a non-compound Forward operator and a non-compound Backward operator.

95. The search device according to claim 92, wherein said at least one of forward and backward link analysis comprises using at least one of a non-normalized Forward operator and a non-normalized Backward operator.

96. The search device of claim 92, further comprising:
means for scoring each of said at least two documents via at least one of text relevancy analysis and file quality analysis.

97. The search device of claim 92, wherein the means for determining a directed, weighted link between at least two of said plurality of documents includes means for establishing a hyperlink between a first document and a second document, wherein said means for establishing a hyperlink comprises one of:
means for anchoring said hyperlink in text of one of said first and second documents,
means for linking said first and second document with an unanchored hyperlink, wherein
said means for establishing a hyperlink further comprises one of:
means for entering said hyperlink via an input terminal, and
means for establishing said hyperlink automatically.

* * * * *